United States Patent
Deepak et al.

(10) Patent No.: US 11,496,208 B1
(45) Date of Patent: Nov. 8, 2022

(54) EFFICIENT SYNCHRONIZATION OF COMMUNICATION INVOLVING HALF-DUPLEX SYSTEMS

(71) Applicant: Amazon Technologies, Inc., Seattle, WA (US)

(72) Inventors: Deepak, Sammamish, WA (US); Mohammad Mamunur Rashid, Redmond, WA (US); Bulin Zhang, Kirkland, WA (US); Ali Masoomzadeh, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 233 days.

(21) Appl. No.: 16/983,826

(22) Filed: Aug. 3, 2020

(51) Int. Cl.
| | |
|---|---|
| *H04B 17/364* | (2015.01) |
| *H04W 24/08* | (2009.01) |
| *H04L 1/18* | (2006.01) |
| *H04W 72/08* | (2009.01) |
| *H04B 7/185* | (2006.01) |
| *H04L 5/14* | (2006.01) |

(52) U.S. Cl.
CPC ......... *H04B 7/18513* (2013.01); *H04L 5/14* (2013.01)

(58) Field of Classification Search
CPC .... H04B 7/1851; H04B 17/364; H04B 7/185; H04B 7/18513; H04B 7/195; H04B 7/18519; H04B 7/2041; H04B 7/18517; H04B 7/18521; H04B 7/18523; H04L 1/1825; H04L 1/1822; H04L 5/0055; H04L 5/14; H04L 5/16; H04W 72/085; H04W 72/042; H04W 72/04; H04W 72/0446; H04W 24/08; G01S 19/05; G01S 19/42

USPC .......................................................... 370/277
See application file for complete search history.

(56) References Cited

U.S. PATENT DOCUMENTS

| | | | | |
|---|---|---|---|---|
| 9,654,206 | B1 * | 5/2017 | Johnson | H04L 45/745 |
| 11,316,582 | B1 * | 4/2022 | Rashid | H04B 7/18528 |
| 2006/0104333 | A1 * | 5/2006 | Rainbolt | H04B 1/713 |
| | | | | 375/132 |
| 2008/0086267 | A1 * | 4/2008 | Stolte | H04B 7/18513 |
| | | | | 701/300 |
| 2017/0005741 | A1 * | 1/2017 | Wu | H04B 7/185 |
| 2017/0257836 | A1 * | 9/2017 | Ho | H04W 56/009 |
| 2018/0006710 | A1 * | 1/2018 | Buer | H04B 7/18521 |

(Continued)

FOREIGN PATENT DOCUMENTS

WO WO-2021254304 A1 * 12/2021 ........... H04W 72/04

*Primary Examiner* — Edan Orgad
*Assistant Examiner* — Vanneilian Lalchinthang
(74) *Attorney, Agent, or Firm* — Kilpatrick Townsend & Stockton PLLC

(57) ABSTRACT

Techniques for improving the efficiency of transmitting data between devices are described. In an example, a first device transmits first data to a second device during a first time interval, whereby the second device is configured to communicate with the first device in a half-duplex mode. During a second time interval, the first device receives second data from the second device. The first device then determines that the second device transmitted the second data during a third time interval that is between the first time and the second time, and during which a reception of the first data by the second device is expected. The first device then retransmits the first data based at least in part on determining that the second device transmitted the second data during the third time interval.

20 Claims, 13 Drawing Sheets

(56) References Cited

U.S. PATENT DOCUMENTS

| | | | |
|---|---|---|---|
| 2018/0014241 A1* | 1/2018 | Perdomo | H04L 67/52 |
| 2020/0076544 A1* | 3/2020 | Lin | H04W 72/085 |
| 2020/0205108 A1* | 6/2020 | Alasti | H04W 74/0833 |
| 2021/0175961 A1* | 6/2021 | Liu | H04W 56/006 |
| 2021/0273719 A1* | 9/2021 | Wang | H04B 7/18513 |

* cited by examiner

EFFICIENT SYNCHRONIZATION OF COMMUNICATION INVOLVING HALF-DUPLEX SYSTEMS

BACKGROUND

Satellites can be launched into orbit to provide various functionalities. For example, a communications satellite can generate a communications channel between a source device and a destination device at different locations on Earth and can relay and amplify radio telecommunications signals exchanged between the two devices via a transponder of the communications satellite. Of course, other types of satellites can be launched and used, including weather satellite, imaging satellites, and the like.

In some cases, a communications satellite may receive and/or transmit data to particular types of devices on Earth that are configured to communicate with the communications satellite in a half-duplex mode. Accordingly, these half-duplex devices may only communicate in one direction at a time (e.g., receiving or transmitting, but not both at the same time).

BRIEF DESCRIPTION OF THE DRAWINGS

Various embodiments in accordance with the present disclosure will be described with reference to the drawings, in which.

DETAILED DESCRIPTION

Figure 1:
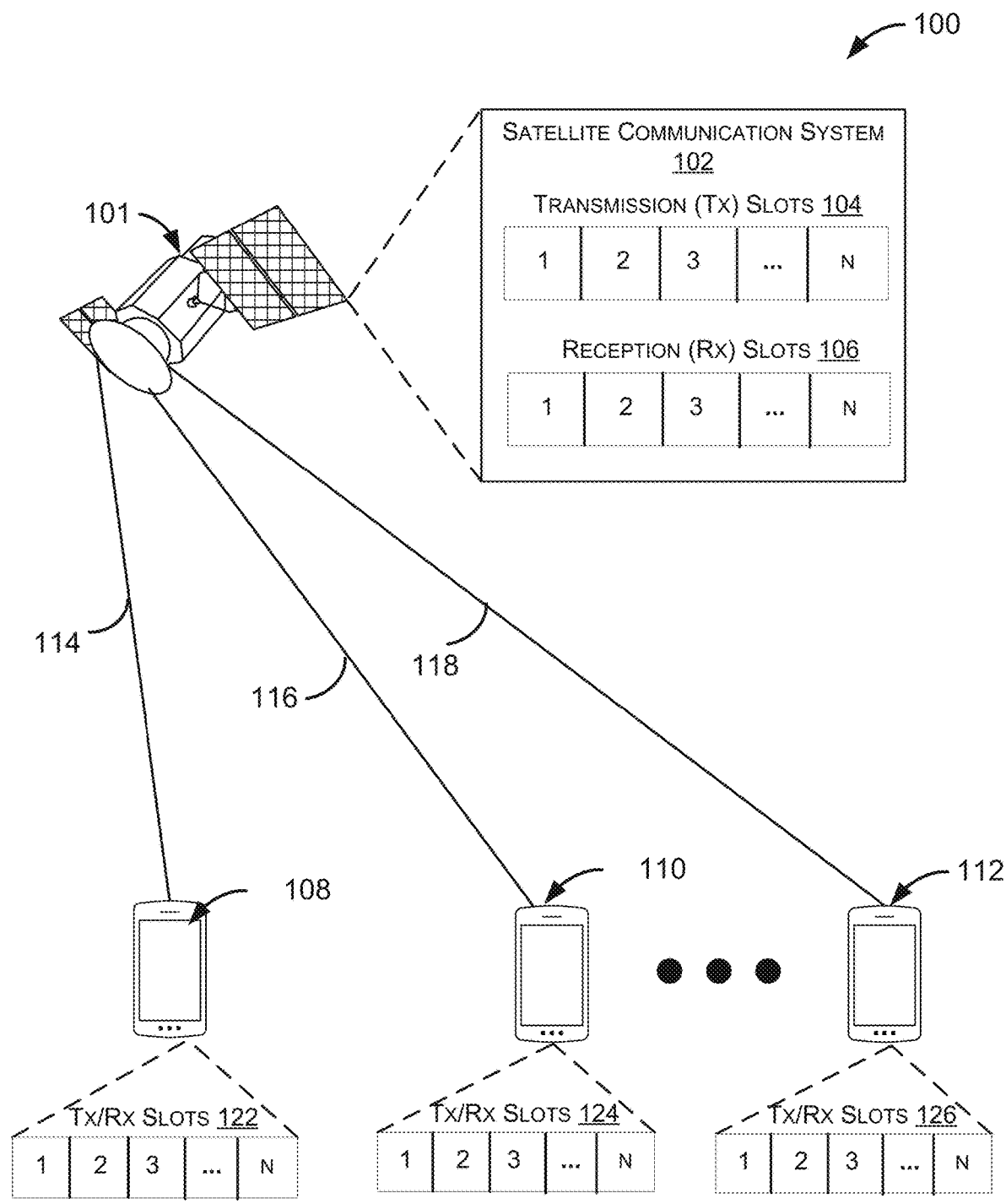
FIG. 1 illustrates an example environment for efficiently synchronizing data communications with one or more devices configured to communicate in a half-duplex mode, according to embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, improving the efficiency of data communications between computing devices, whereby at least one of the devices is configured to communicate in a half-duplex mode. In an example, a first computing device (e.g., associated with a satellite) may transmit first data at a first time to a second computing device (e.g., a user terminal device on Earth), whereby the second computing device is configured to communicate with the first computing device in a half-duplex mode. The first computing device may determine that the first data is expected to be received by the second computing device at a second time (e.g., a particular time interval and/or a particular slot), based on a known propagation delay between the two computing devices. The first computing device may also determine that the second computing device has an opportunity to transmit second data to the first computing device at the second time. Accordingly, the first computing device may determine, given that the second computing device is configured to communicate in the half-duplex mode, that the first data transmitted to the second device may not be received if the second computing device takes advantage of the transmission opportunity by transmitting the second data at the second time. The first computing device may therefore store the first data in a storage buffer (e.g., memory) for future retrieval in the event that a retransmission of the first data is needed.

Subsequently, the first computing device may receive the second data from the second computing device at a third time. The first computing device may determine that the second data was transmitted from the second computing device at the second time, based in part on a known propagation delay from the second computing device to the first computing device. Accordingly, the first device may determine that the first data was not received by the second computing device at the second time. The first computing device may then retrieve the first data from the storage buffer, and retransmit the first data to the second computing device. In this way, the first computing device may reduce data transmission latencies, even when the first computing device has not received information in advance that indicates whether the second computing device will take advantage of a transmission opportunity at a particular time.

To further illustrate, consider an example of a satellite communication system that includes at least one satellite device in space. The satellite communication system may include a scheduler that coordinates scheduling the transmission and/or receiving of data to and/or from one or more customer terminal devices (e.g., terminal devices on Earth and operable by customers of one or more service providers providing data communications services that rely on the satellite communication system). The satellite communication system may also include a downlink transmitter and an uplink receiver that, respectively, transmit data (referred to as "downlink data") and receive data (referred to as "uplink data") from the one or more terminal devices. The transmitter and the receiver may use separate communication channels to send downlink data and/or receive uplink data. In some embodiments, a customer terminal device may be any suitable computing device that is configured to communicate with the satellite communication system in a half-duplex mode. For example, the customer terminal device may be a mobile device (e.g., a mobile phone) that includes a transceiver, whereby the transceiver enables communication in both directions (e.g., between the satellite communication system and the terminal device), but by using only one direction at a time (e.g., not simultaneously). The customer terminal device may send and/or receive data that is routed via the satellite communication system.

Continuing with the above illustration, consider a scenario in which the satellite communication system transmits downlink data to the terminal device at a first slot (e.g., a slot "5" within an ordered number of slots, for example, 1 through N) and expects the downlink data to be received by the customer terminal device at a second slot (e.g., slot "13"). The satellite communication system may determine the expected reception slot (e.g., slot "13") based on a first known propagation delay (e.g., a time offset) between the satellite communication system and the customer terminal device. For example, the first known propagation delay may correspond to a length of time taken for a signal, transmitted from the satellite communication system at a particular frequency, to reach the terminal device. The satellite communication system may subsequently receive uplink data from the customer terminal device at another slot (e.g., slot "21"). The satellite communication system may then determine, based on a second known propagation delay, that the customer terminal device transmitted the uplink data at slot "13." In this case, the known propagation delay may correspond to a length of time taken for a signal, transmitted from the customer terminal device, to reach the satellite communication system. The satellite communication system may thus determine that the downlink data was not received by the customer terminal device at slot "13" (e.g., since the customer terminal device operates in half-duplex mode, and was transmitting uplink data at slot "13"). This determination, based on receiving the uplink data at the particular slot (e.g., slot "21"), may be referred to as an inference of an implicit negative acknowledgment (or "implicit NACK"). The satellite communication system may then determine, based on the implicit negative acknowledgment, to retransmit the downlink data.

In some embodiments, the satellite communication system may determine whether or not a transmission (and/or retransmission) of downlink data was successful based on inferring an implicit acknowledgement (e.g., an "implicit ACK") from the customer terminal device. In one embodiment, an implicit acknowledgment may be inferred by the satellite communication system based on determining that the customer terminal device did not transmit subsequent data to be received by the satellite communication system. For example, the satellite communication system may determine that no uplink data was received by the satellite communication system from the customer terminal device within a particular time interval (e.g., from slot "5" through slot "21"). In another embodiment, an implicit acknowledgment may be inferred by the satellite communication system based on determining that, although uplink data was transmitted by the customer terminal device, the transmission of uplink data by the terminal device does not conflict with the reception of the downlink data by the customer terminal device. For example, the uplink data may have been transmitted at slot "12" (instead of the transmission opportunity at slot "13"). In this example, because the transmission of uplink data at slot "12" does not conflict with the reception of the downlink data at slot "13," the satellite communication system may infer an implicit acknowledgment that the downlink data was received by the customer terminal device. In some embodiments, the satellite communication system may determine a plurality of transmission opportunities for the customer terminal device. For example, slot "13" through slot "20" may correspond to a plurality of transmission opportunities for the customer terminal device. Based on a known propagation delay (e.g., a corresponding time offset associated with a number of slots, for example, eight offset slots), the satellite communication system may infer an implicit ACK upon determining that no uplink data was received by the satellite communication system at any of slots "21" through slot "28" (e.g., inferring that the customer terminal device did not transmit data during any of slots "13" through "20"). In any case, upon the satellite communication system confirming that the transmission (and/or retransmission) of downlink data was successful, the satellite communication system may determine that a subsequent retransmission is not needed.

In some embodiments, when transmitting particular downlink data that is expected for reception by a customer terminal device at a slot corresponding to a transmission opportunity, the satellite communication system may store the downlink data in a storage buffer, in case the downlink data may need to be subsequently retransmitted (e.g., in case of an implicit negative acknowledgment). Later, upon confirming that the initial transmission and/or retransmission was successful (e.g., inferring an implicit acknowledgment), the satellite communication system may remove the downlink data from the storage buffer.

Embodiments of the present disclosure provide several technical advantages over conventional techniques. For example, techniques described herein enable a satellite communication system to improve efficiency in utilizing bandwidth resources. As described above, because it may be unknown whether a terminal device may transit uplink data at a slot corresponding to a transmission opportunity, a conventional satellite communication system may otherwise not transmit downlink data for reception by the terminal device at that slot (e.g., to avoid the risk that the downlink data is not received by the terminal device). However, especially in a case where a transmission opportunity may be shared by a large number of terminal devices, only a fraction of those devices may actually transmit uplink data at the particular transmission opportunity. Thus, if the conventional satellite communication system does not transmit downlink data, bandwidth resources may not be efficiently utilized. However, as described herein, embodiments enable a satellite communication system to transmit downlink data to the full number of terminal devices, and then to efficiently detect which fraction of devices require a retransmission of downlink data (e.g., utilizing an implicit NACK). By utilizing an implicit NACK to determine whether a reception-transmission conflict occurred, and utilizing an implicit ACK to determine if a transmission was successful, embodiments efficiently shorten the time needed to determine whether a transmission (and/or retransmission) was successful (e.g., not requiring the satellite communication system to wait for an explicit acknowledgment from the terminal device). In this way, embodiments, enable the satellite communication system to efficiently utilize bandwidth resources, while, at the same time, reduce transmission latencies and mitigate a performance impact to the fraction of terminal devices that require retransmission of the downlink data.

For clarity of illustration, various embodiments of the present disclosure are described in connection with a terminal device on Earth and a satellite communication system that includes a satellite placed into orbit around the Earth in space. However, the embodiments are not limited as such. In particular, the embodiments, generally apply to any suitable first computing device and second computing device, whereby the second device communicates with the first device in a half-duplex mode. It should be understood that the second device may be representative of a plurality of devices that each communicate with the first device in the half-duplex mode. Furthermore, the first device and the second device may, respectively, be located at any suitable geographic location. For example, both devices may be on Earth and separated by a particular distance. In this example, the time-shifting (e.g., a time offset due to a propagation delay) between the two devices may be different from a scenario in which the first device (e.g., a satellite in space) is associated with a satellite communication system and the second device is a terminal device on Earth. Additionally, it should be understood that any suitable communication channels and/or protocols may be used to perform embodiments of the present disclosure. For example, embodiments described herein may typically involve one or more terminal devices that utilize a shared channel (e.g., whereby the transmission opportunity is a shared resource). However, embodiments may also be performed in cases where a particular channel is not a shared resource, for example, whereby a terminal device does not contend with other terminal devices when transmitting uplink data to the satellite communication system. In another example, although embodiments described herein primarily refer to scheduling transmission of data according to "slots," embodiments should not be construed to be so limiting and can similarly apply to a conflict between a transmission unit and a reception unit, where a unit can be a unit of time (e.g., a time interval). For example, embodiments described herein may primarily refer to slots in the context of a medium access control (MAC) protocol. In this case, a "slot" may correspond to a time interval of, for example, five-hundred microseconds, and the slot may be the primary timing unit for MAC functions and may be used for defining MAC protocol parameters. However, any suitable time unit and/or protocol may be used to perform embodiments described herein. Generally, a time interval is a unit of time during which transmission and/or reception can be performed. The time interval can be predefined to have a certain length (e.g., five-hundred microseconds) based on a communications protocol between devices, and/or can be configured and/or adjusted to have the certain length based on signaling between the devices.

FIG. 1 illustrates an example environment 100 for efficiently synchronizing data communications with one or more devices configured to communicate in a half-duplex mode, according to embodiments of the present disclosure. As illustrated, the example environment 100 includes a satellite communication system 102 and one or more terminal devices, represented by terminal devices 108, 110, and 112. The satellite communication system 102 may include (and/or be communicatively connected to) one or more hardware and/or software components. For example, the satellite communication system 102 may include hardware components such as a satellite 101 in space. The satellite communication system 102 may also include hardware components including, among other components, a transmitter and a receiver. The transmitter may be an electronic device that generates radio waves that are transmitted over a distance. The receiver may be an electronic device that receives radio waves and converts the information carried by them to a usable form. Any suitable transmitter and/or receiver may be used to perform embodiments of the present disclosure. The satellite communication system 102 may also include software components, including, among other components, a scheduler. The scheduler may be responsible for scheduling a transmission of downlink data from the satellite communication system 102 via the transmitter. In some embodiments, the scheduler may schedule the transmission of downlink data according to an ordered sequence of transmission slots 104 (e.g., numbered from slot "1" through slot "N"). As described herein, in one example, the slots may be determined (e.g., defined and/or divided) according to a particular time interval (e.g., 0.5 milliseconds). Data that is transmitted at a particular slot may be transmitted via a suitable modulation scheme (e.g., frequency modulation) for the duration of the time interval that defines the slot. In some embodiments, any suitable method (e.g., a particular multiple access technique) may be used to regulate access to a channel by multiple devices, including, but not limited to, Orthogonal Frequency-Division Multiple Access (OFDMA), Time Division Multiple Access (TDMA), Code Division Multiple Access (CDMA), etc.). The scheduler may also coordinate (e.g., synchronize) transmissions of downlink data based in part on determining when uplink data is received from one of the terminal devices. For example, the scheduler may receive information indicating a particular slot among an ordered sequence of reception slots 106 (e.g., also numbered from slot "1" through slot "N") in which uplink data is received by the receiver of the satellite communication system 102 from a terminal device. The scheduler may then process this information (and/or the data received at the particular slot), and then determine one or more operations to perform (e.g., scheduling a transmission (and/or retransmission) of downlink data from one of the transmission slots 104).

In some embodiments, a terminal device may be any suitable computing device that is configured to communicate with the satellite communication system 102 in a half-duplex mode. It should be understood that the terminal device may include hardware and/or software components that are capable of communicating in either a half-duplex or a full-duplex mode. In some embodiments, the terminal device may configure the components to operate in the half-duplex mode. For example, the terminal device may be enrolled in a particular data plan with a service provider (e.g., associated with receiving a certain quality of service), in which the terminal device communicates with the satellite communication system 102 (e.g., of the service provider) in the half-duplex mode. As depicted in FIG. 1, each of the representative terminal devices 108, 110, and 112 are mobile devices (e.g., mobile phones). Other non-limiting examples of terminal device types may include a tablet, a laptop, an Internet of Things (IoT) device, a base station, a ground station, or any half-duplex configured device. In some embodiments, and, as described herein, each terminal device may include a transceiver, whereby the transceiver enables communication in both directions (e.g., between the satellite communication system 102 and the respective terminal device), but only one direction at a time (e.g., not simultaneously). Accordingly, if a terminal device determines to transmit uplink data at a particular time (e.g., and/or slot), the terminal device may switch a circuitry of the transceiver from a reception mode to a transmission mode. While the terminal device is in transmission mode (e.g., during a time interval in which the terminal device prepares to transmit uplink data), the terminal device may not receive data (e.g., from the satellite communication system 102) because the terminal device is not in the reception mode. In some embodiments, each terminal device may determine (e.g., synchronize and/or schedule) a transmission of uplink data and/or reception of downlink data according to an ordered sequence of slots (e.g., also numbered from slot "1" through slot "N"). For example, as depicted in FIG. 1, terminal device 108 may synchronize data transmission and/or reception according to transmission/reception slots 122, terminal device 110 may synchronize data transmission and/or reception according to transmission/reception slots 124, and terminal device 112 may synchronize data transmission and/or reception according to transmission/reception slots 126.

It should be understood that uplink data transmitted by a terminal device may correspond to any suitable type of data. For example, one type of uplink data may correspond to control information used to synchronize communications associated with a particular communication channel. Another example of uplink data may correspond to traffic data between devices, where the traffic data is routed through the satellite communication system 102. Different types of channels are available for the uplink data. In one example, a random access channel (RACH) is used. In another example, a scheduled channel is used, where the scheduled channel can be dedicated to the terminal device or shared between multiple terminal devices. Similarly, downlink data transmitted by the satellite communication system 102 may also correspond to any suitable type of data and may use one or more types of channels.

In some embodiments, downlink data transmitted by the transmitter of the satellite communication system 102 at a particular slot of the transmission slots 104 (e.g., slot "5") may be received by a particular terminal device based at least in part on a propagation delay from the satellite communication system 102 to the particular terminal device. In some embodiments, the propagation delay may be known by the satellite communication system 102 for a particular frequency band. The propagation delay may depend in part on one or more factors, including, for example, a distance between the particular terminal device (e.g., the distance at a given time) and the satellite communication system 102, the frequency of the signal used to transmit the downlink data, a presence of one or more obstacles in between the terminal device and the satellite communication system 102, etc. The satellite communication system 102 may determine the propagation delay of downlink data transmitted from the satellite communication system 102 to the terminal device 108 using any suitable method, for example, measuring the propagation delay based on round trip measurements, timing advance commands, and/or clock synchronizations from previous transmissions between the two devices. As depicted in FIG. 1, a distance 114 between the satellite communication system 102 and the terminal device 108 may be different from a distance 116 and/or a distance 118 (e.g., indicating the respective distances from the other terminal devices to the satellite communication system 102). Accordingly, the known propagation delay between the satellite communication system 102 and each device may be different. It should be understood that, although the propagation delay between the satellite communication system 102 and a terminal device may be substantially the same for a given distance (e.g., whether transmitting or receiving data), embodiments are not so limiting. For example, the frequency of a signal transmitted from the satellite communication system 102 to the terminal device (e.g., terminal device 108) may be different from the frequency of a signal transmitted from the terminal device 108 to the satellite communication system 102.

Figure 2:
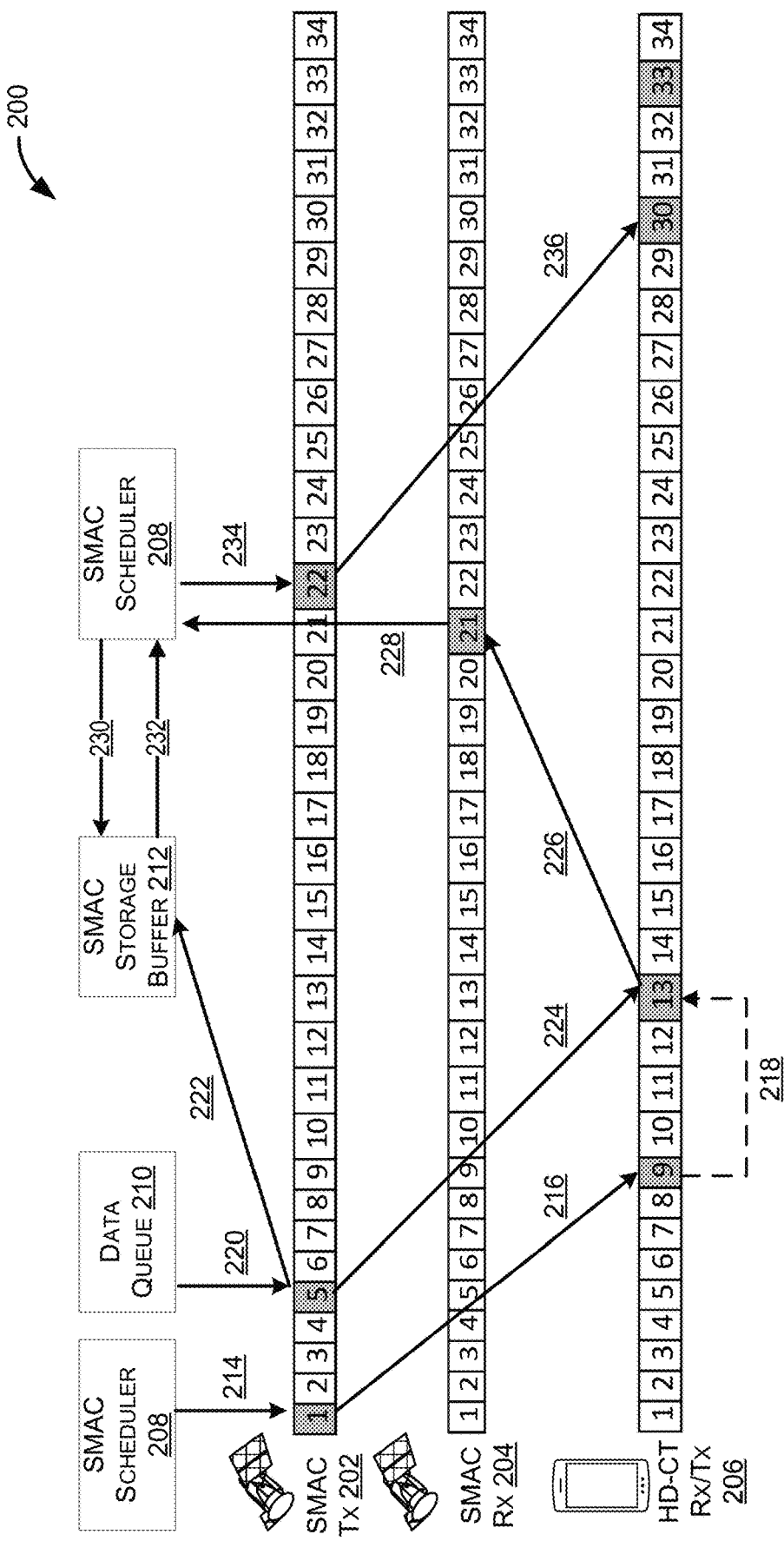
FIG. 2 illustrates an example technique for efficiently synchronizing data communications with a device configured to communicate in a half-duplex mode, according to embodiments of the present disclosure.

In some embodiments, as described in further detail with respect to FIG. 2, the satellite communication system 102 may efficiently synchronize communications with one or more terminal devices based at least in part on inferring an implicit acknowledgment or an implicit negative acknowledgment from each terminal device in response to downlink data transmitted by the satellite communication system 102 to the respective terminal device. For example, the satellite communication system 102 may transmit downlink data at slot "5" (e.g., of the transmission slots 104) to the terminal device 108. Based in part on the known propagation delay from the satellite communication system 102 to the terminal device 108, the satellite communication system 102 may determine that slot "13" (e.g., a particular slot/time interval of the transmission/reception slots 122) is a time interval indicative of an expected receipt of the downlink data by the terminal device 108. The satellite communication system 102 may also determine that slot "13" of the transmission/reception slots 122 corresponds to an available transmission opportunity in which the terminal device 108 may transmit uplink data to the satellite communication system 102. At slot "21" of the reception slots 106, the satellite communication system 102 may receive uplink data from the terminal device 108. The satellite communication system 102 may determine, based on a known propagation delay from the terminal device 108 to the satellite communication system 102, that the uplink data was transmitted at slot "13" of the transmission/reception slots 122. Accordingly, the satellite communication system 102 may infer an implicit negative acknowledgment that the terminal device 108 did not receive the downlink data at slot "13" (since the terminal device 108 was transmitting uplink data in a transmission mode of the half-duplex mode at slot "13"). The satellite communication system 102 then determines to retransmit the downlink data. In another example, the satellite communication system 102 may not receive any uplink data from the terminal device at slot "21" of the reception slots 106. In this case, the satellite communication system 102 may infer an implicit acknowledgment, and thus determine that a retransmission of the downlink data is not needed.

FIG. 2 illustrates an example technique for efficiently synchronizing data communications with a device configured to communicate in a half-duplex mode, according to embodiments of the present disclosure. As illustrated, the diagram 200 of FIG. 2 depicts several elements, including a satellite medium access control (SMAC) scheduler 208, a data queue 210, a SMAC storage buffer 212 (e.g., a memory or other suitable storage device), SMAC transmission (Tx) slots 202, SMAC reception (Rx) slots 204, and a half-duplex customer terminal device (HD-CT) 206 with associated transmission/reception slots (e.g., similar to any one of the transmission/reception slots (e.g., 122) of FIG. 1).

In some embodiments, the SMAC scheduler 208, the data queue 210, and the SMAC storage buffer 212 may be components of a satellite communication system, which may be similar to the satellite communication system 102 of FIG. 1. In some embodiments, one or more of these components may operate within a MAC layer of the satellite communication system, and thus, may be labeled accordingly (e.g., as a satellite MAC (SMAC) component). In some embodiments, as described further herein, each of these components may interact to coordinate transmission and/or reception of data at the SMAC layer of the satellite communication system. In some embodiments, the SMAC scheduler 208 may communicate with the transmitter and/or receiver of the satellite communication system. For example, the SMAC scheduler 208 may transmit information to the transmitter including instructions (and/or data) to transmit downlink data at a particular slot of the SMAC transmission slots 202. Similarly, the SMAC scheduler 208 may receive information from the receiver of the satellite communication system indicating a reception of uplink data at a particular slot of the SMAC reception slots 204. In some embodiments, the SMAC scheduler 208 may also be responsible for determining a grant of one or more transmission opportunities for at least one terminal device. As further illustrated below, embodiments of the present disclosure may enable the SMAC scheduler 208 to efficiently synchronize communications a terminal device (e.g., terminal device 206) that has received a grant of one or more transmission opportunities.

Consider a scenario in which the SMAC scheduler 208 of the satellite communication system determines to grant one or more transmission opportunities to the terminal device 206. As described herein, a grant of a transmission opportunity may correspond to one or more slots (e.g., time slots) in an ordered sequence of slots (e.g., numbered from slot "1" through slot "N"). Suppose that, in this example, the transmission opportunities are granted to the terminal device 206 on a periodic basis (e.g., once every twenty slots). For example, the terminal device 206 may be granted a transmission opportunity to transmit data at slot "13," slot "33," slot "53," etc. At 214, the SMAC scheduler 208 may transmit data indicating the grant to the transmitter of the satellite communication system. At 216, and, at slot "1" of the SMAC transmission slots 202, the transmitter of the satellite communication system may then transmit a list indicating the one or more transmission opportunities to the terminal device. In some embodiments, a grant of a transmission opportunity corresponding to a particular slot may be provided by the satellite communication system to a plurality of terminal devices as a shared opportunity to transmit uplink data at the particular slot (e.g., as described in reference to FIG. 3). As depicted in FIG. 2, the list indicating the one or more transmission opportunities may be received by the terminal device 206 at a particular slot (e.g., slot "9"). In this example, there may be a known propagation delay when transmitting data to the terminal device 206 based in part on a distance between the satellite communication system and then terminal device 206. This known propagation delay may correspond to a time offset (e.g., due to time shifting of the signal) determined between the satellite communication system and the terminal device 206, whereby the determined time offset may be mapped to a particular number of offset slots. In this example, there may be eight offset slots from slot "1" of the SMAC transmission slots 202 to slot "9" of the transmission/reception slots of the terminal device 206 (which may be also referred to herein as "terminal device slots"). In the illustration of FIG. 2, for clarity of illustration, the known propagation delay at a given distance may be the same (e.g., corresponding to eight offset slots) with respect to downlink data (e.g., transferred from the satellite communication system to the terminal device 206) and uplink data (e.g., transferred from the terminal device 206 to the satellite communication system). However, as described above, embodiments should not be construed to be so limiting. For example, in a case where the frequencies of the signals being transmitted and/or received are different, the respective known propagation delays may be different. Accordingly, in some embodiments, the propagation delay may vary as a function of signal properties (e.g., frequency) and/or distance.

Upon the satellite communication system transmitting the grant list to the terminal device 206 at 216, it should be understood that information indicating whether the terminal device 206 may take advantage of a particular transmission opportunity (e.g., slot "13") granted to the terminal device may be yet unknown to the satellite communication system. Note that, as depicted in FIG. 2, the slots "13" and "33" corresponding to available transmission opportunities are highlighted. Also, other highlighted slots in FIG. 2 (e.g., SMAC transmission slot "1," terminal device slot "9," etc.) may correspond to slots in which data was transmitted from and/or received by a particular device, as discussed further herein. At 218, upon having received the list of transmission opportunities at slot "9," the terminal device 206 may determine whether to transmit data at slot "13" (e.g., the next available transmission opportunity slot). This determination of whether to transmit data at slot "13" is indicated by the dotted line in FIG. 2. In an event that the terminal device 206 determines to transmit uplink data at the slot "13," downlink data that is transmitted from the satellite communication system for reception by the terminal device 206 at slot "13" may not be received (e.g., due to the uplink data transmission from the terminal device 206, while operating in the half duplex mode). However, if the terminal device 206 determines not to utilize the transmission opportunity at slot "13" (e.g., not transmitting uplink data), then downlink data transmitted from the satellite communication system (e.g., at slot "5", described further below) may be received by the terminal device 206 at slot "13." It should be understood that, if the satellite communication system determines to not transmit downlink data for reception by the terminal device at slot "13" due to the possibility of a reception-transmission conflict, then there is a potential for wasted resources (e.g., non-utilized bandwidth, in an event that the terminal device 206 also does not transmit uplink data at slot "13").

Suppose that, continuing with the above illustration, the SMAC scheduler 208 of the satellite communication system receives an indication that data is ready for transmission to the terminal device 206. For example, at 220, the satellite communication system may retrieve data from the data queue 210. The data may have been transmitted from another device (e.g., over an Internet connection) that is intended for the terminal device, with the satellite communication system operating as a relay device. Accordingly, the satellite communication system may have received the data into the data queue 210 to await transmission to the terminal device 206. In this example, suppose that the SMAC scheduler 208 of the satellite communication system determines that, upon transmitting downlink data (e.g., that includes the data received over the Internet) at a particular slot (e.g., slot "5"), the downlink data is expected for reception by the terminal device at slot "13" (which, in this example, also corresponds to a transmission opportunity). In one example, the SMAC scheduler 208 may determine the reception slot "13" based on the known propagation delay between the satellite communication system and the terminal device 206. Accordingly, at 222, the SMAC scheduler 208 of the satellite communication system determines to store the data in the SMAC storage buffer 212 (e.g., a memory) in case the downlink data needs to be retransmitted. At 224, the transmitter of the satellite communication system then transmits the downlink data at slot "5" of the transmission slots 202 for reception by the terminal device at slot "13" of the terminal device slots. It should be understood that the storage of downlink data in the SMAC storage buffer 212 may be performed at any suitable time (e.g., shortly before or after transmission of the downlink data at 224). It should also be understood that any suitable data may be stored in association with the downlink data. For example, the SMAC scheduler 208 may determine to store a transmission slot identifier of the transmission slot (e.g., slot "5") from which the downlink data was transmitted from, a reception slot identifier of the expected reception slot for the terminal device (e.g., slot "13"), a destination device identifier for the destination terminal device (e.g., a unique numeric identifier), etc. In some embodiments, the SMAC scheduler 208 may also store a list of one or more transmission opportunity slot identifiers in association with a particular destination device identifier, indicating, for the particular destination terminal device, which slots correspond to transmission opportunities. It should be understood that a particular downlink data may be stored in association with one or more unique device identifiers, and the respective device identifiers may be associated with different destination terminal devices. This data may be used by the SMAC scheduler 208 to later perform one or more operations related to retransmitting the downlink data, for example, retrieving the appropriate downlink data for the particular destination terminal device, determining whether a retransmission is required, etc.

Subsequently, at 226, the receiver of the satellite communication system may receive uplink data from the terminal device 206 at another particular slot (e.g., at slot "21"). At 228, information regarding the reception of the uplink data at slot "21" may be received by the SMAC scheduler 208. The SMAC scheduler 208 may then determine that the uplink data was transmitted from the terminal device 206 to the satellite communication system at slot "13." For example, as described above, the SMAC scheduler 208 may determine a known propagation delay corresponding to a length of time taken for a signal transmitted from the terminal device 206 at a particular frequency to reach the satellite communication system (e.g., in this case, as described above, the time offset may correspond to eight offset slots).

At 230, upon determining that the uplink data was transmitted from the terminal device 206 at slot "13," the SMAC scheduler 208 of the satellite communication system may determine to retransmit the downlink data. For example, the SMAC scheduler 208 may determine that the uplink data corresponds to an implicit negative acknowledgment (an implicit NACK). In this case, instead of explicitly receiving negative acknowledgment (NACK) data from the terminal device 206 indicating that the downlink data was not received (e.g., and/or was otherwise rejected due to an error), the SMAC scheduler 208 may infer that the downlink data that was sent at slot "5" was not received. The SMAC scheduler 208 may infer this information at least because the satellite communication system is aware that the terminal device is operating in a half-duplex mode and also that the terminal device 206 transmitted uplink data at slot "13" (thus, implying that the terminal device 206 did not receive the downlink data at slot "13"). Accordingly, the SMAC scheduler 208 may then request the previously stored downlink data from the SMAC storage buffer 212, and then subsequently receive (e.g., retrieve) the downlink data at 232. In some embodiments, as discussed above and further herein (e.g., with respect to FIG. 3), the SMAC scheduler 208 may retrieve the downlink data from the SMAC storage buffer 212 by utilizing a unique destination device identifier that corresponds to the downlink data previously stored and associated with the particular transmission (e.g., at 224) to the terminal device 206. For example, suppose that the unique destination device identifier previously stored at 222 corresponds to a unique MAC address (e.g., or other suitable identifier) of the terminal device 206. Upon later receiving the uplink data, the SMAC scheduler 208 may identify which device (e.g., terminal device 206) sent the uplink data by utilizing data packet information (e.g., within the uplink data (e.g., header information including the MAC address of the terminal device 206). The SMAC scheduler 208 may then retrieve the stored downlink data for the terminal device 206 by using the unique destination device identifier (e.g., the MAC address) as a key. In some embodiments, the SMAC scheduler 208 may further determine whether (and/or when) to retransmit the downlink data by comparing one or more slot identifiers. For example, in some embodiments, the SMAC scheduler 208 may compare the slot in which the uplink data was transmitted by the terminal device 206 (e.g., slot "13") with an expected reception slot identifier previously stored (e.g., also indicating slot "13"). In some embodiments, the SMAC scheduler 208 may further utilize the previously store transmission slot identifier (e.g., slot "5") and/or the list of previously stored transmission opportunity slot identifiers for terminal device 206 to determine when to retransmit the downlink data (e.g., to achieve a desired level of quality of service, and reduce data transmission latencies). In at least this way, the SMAC scheduler 208 may coordinate retrieval of stored data and/or retransmission across a plurality of terminal devices.

Upon retrieving the downlink data from the storage buffer at 232, the SMAC scheduler 208 may, at 234, determine another slot to retransmit the downlink data. For example, the SMAC scheduler 208 may determine that a retransmission of the downlink data at another slot (e.g., slot "22") is expected to be received by the terminal device 206 at slot "30." In some embodiments, the SMAC scheduler 208 may seek for the soonest available slot (e.g., in this case, slot "22," which immediately follows slot "21"). In some embodiments, because this is a retransmission of downlink data, the SMAC scheduler 208 may determine to ensure that the retransmission is likely to be successful (e.g., that the terminal device 206 will be in a reception mode at the expected reception slot "30"), for example, to ensure a more timely delivery of the downlink data. Accordingly, the SMAC scheduler 208 may confirm that slot "30" does not correspond to another transmission opportunity available to the terminal device 206. Continuing with the illustration above, the SMAC scheduler 208 may confirm that the next transmission opportunity for the terminal device 206 is slot "33," and thus, the terminal device 206 is expected to be in a reception mode of the half-duplex mode at slot "30." In another embodiment, the SMAC scheduler 208 may choose to retransmit the data at another slot that has the potential for conflicting with slot "33." Any suitable method may be used by the SMAC scheduler 208 to determine when to retransmit the downlink data. In any case, upon receiving the downlink data from the storage buffer 212 and determining a slot (e.g., slot "22") to retransmit from, the satellite communication system may, at 236, retransmit the downlink data for reception by the terminal device 206 at terminal device slot "30."

In some embodiments, the SMAC scheduler 208 may determine whether or not a transmission (and/or retransmission) of downlink data was successful based on inferring an implicit acknowledgement (e.g., an implicit ACK) from the terminal device 206. In one embodiment, an implicit acknowledgment may be inferred by the SMAC scheduler 208 based on determining that the terminal device 206 did not transmit subsequent data to be received by the satellite communication system. For example, in a different scenario from that depicted in FIG. 2, the SMAC scheduler 208 may determine that no uplink data was received by the satellite communication system from the terminal device 206 within a particular time interval (e.g., from slot "5" through slot "21"). In another embodiment, an implicit acknowledgment may be inferred by the SMAC scheduler 208 based on determining that, although uplink data was transmitted by the terminal device 206, the transmission of uplink data by the terminal device 206 does not conflict with the reception of the downlink data by the terminal device 206. For example, the uplink data may have been transmitted at slot "12" of the terminal device slots (instead of the transmission opportunity at slot "13"), for example, using a dedicated (e.g., non-shared) communication channel. In this example, because the transmission of uplink data at slot "12" does not conflict with the reception of the downlink data at slot "13," the SMAC scheduler 208 may infer an implicit acknowledgment that the downlink data was received by the terminal device 206. In any case, upon the SMAC scheduler 208 confirming that the transmission (and/or retransmission) of downlink data was successful, the SMAC scheduler 208 may determine that a subsequent retransmission is not needed, and thus may remove the downlink data from the SMAC storage buffer 212.

In some embodiments, as described above, the satellite communication system may grant a transmission opportunity of a particular slot to a plurality of terminal devices. In some embodiments, only a subset of the plurality of terminal devices may transmit uplink data at the particular slot. In this case, and, as illustrated further with respect to FIG. 3, in the event that the satellite communication system determines that a retransmission is needed (e.g., due to inferring an implicit negative acknowledgment from one or more terminal devices, as described above), the satellite communication system may retransmit downlink data to only the subset of devices for which the implicit negative acknowledgement was inferred.

Figure 3:
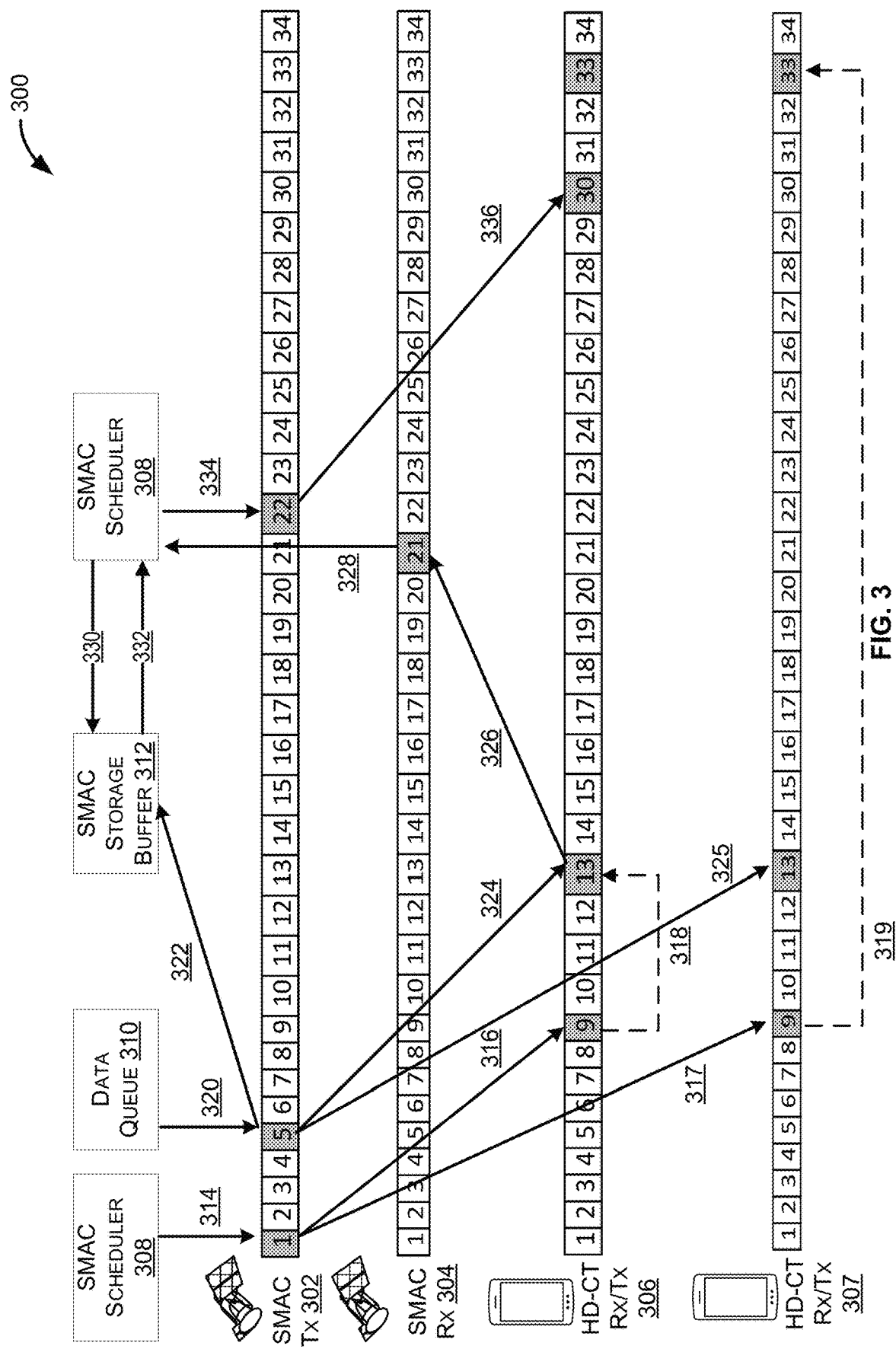
FIG. 3 illustrates an example technique for efficiently synchronizing data communications with a plurality of devices, each configured to communicate in a half-duplex mode, according to embodiments of the present disclosure.

FIG. 3 illustrates an example technique for efficiently synchronizing data communications with a plurality of devices (e.g., instead of just a single terminal device, as in FIG. 2), each configured to communicate in a half-duplex mode, according to embodiments of the present disclosure. The example technique depicted in diagram 300 is similar to that depicted in diagram 200. For example, diagram 300 includes several elements that are similar to corresponding elements depicted in diagram 200, including, for example, an SMAC scheduler 308, a data queue 310, an SMAC storage buffer 312, SMAC transmission (Tx) slots 302, SMAC reception (Rx) slots 304, and a half-duplex customer terminal device (HD-CT) 306 with associated slots. In addition, an additional half-duplex customer terminal device 307 is depicted with associated slots. Also, the SMAC scheduler 308, the data queue 310, and the SMAC storage buffer 312 may be components of a satellite communication system, which may be similar to the satellite communication system 102 of FIG. 1 and/or FIG. 2.

Turning to the technique depicted in diagram 300 in further detail, the SMAC scheduler 308 may determine one or more transmission opportunities for both the terminal device 306 and 307 and transmit this information to each device. For example, similar to FIG. 2, the transmission opportunities may be granted on a periodic basis (e.g., every twenty slots), including slot "13," "33," etc. At 314, the SMAC scheduler 308 may transmit data indicating the grant of transmission opportunities to the transmitter of the satellite communication system. At 316 and 317, respectively, the transmitter may transmit a list indicating the grant of the transmission opportunities to the terminal device 306 and 307. In this example, each terminal device may receive the list at slot "9" (e.g., having a substantially similar (e.g., same) propagation delay), and then may respectively determine whether (and/or when) take advantage of the one or more transmission opportunities granted.

In FIG. 3, the interactions between the satellite communication system and the terminal device 306 are similar to the interactions between the satellite communication system and the terminal device 206 of FIG. 2. For example, at 318, the terminal device 306 determines to transmit uplink data at slot "13." Meanwhile, at 320, the satellite communication system receives data from the data queue 310 (e.g., over the Internet), and then, at 324, transmits the data as downlink data to the terminal device 306 for reception by the terminal device at slot "13." Prior to transmitting the downlink data, at 322, the satellite communication system may store the downlink data in the SMAC storage buffer 312 in association with the transmission opportunity of the terminal device 306. Note that, as described above, the satellite communication system may store an identifier (e.g., a unique destination device identifier) with the downlink data, so that the satellite communication system may later retrieve the appropriate data (e.g., for the appropriate device) upon retransmission. At 326, the terminal device 306 transmits uplink data at slot "13" to be received by the satellite communication system at slot "21" of the SMAC transmission slots 304. At 328, the receiver of the satellite communication system transmits data to the SMAC scheduler 308 indicating the reception of uplink data at slot "21." The SMAC scheduler 308 determines that a retransmission of downlink data is needed (e.g., inferring an implicit NACK), similar to as described above. Accordingly, at 330, the SMAC scheduler requests for downlink data associated with the terminal device 306 from the SMAC storage buffer 312 (e.g., using the unique destination device identifier as input, as described in reference to FIG. 2), and receives the appropriate downlink data at 332. At 334, the SMAC scheduler transmits the data to the transmitter for subsequent retransmission at slot "22" of the SMAC transmission slots 302. At 336, the transmitter retransmits the downlink data for reception by the terminal device 306 at slot "30" of the terminal device 306 slots. The SMAC scheduler 308 may then remove the corresponding downlink data from the SMAC storage buffer 312.

Turning to terminal device 307, and, in contrast to terminal device 306, upon receiving the list of transmission opportunities at 317, the terminal device 307 determines, at 319, not to transmit uplink data at slot "13," and instead to transmit at the next available slot (e.g., slot 33). In this case, at 325, when the satellite communication system transmits downlink data at slot "5", the terminal device 307 may receive the downlink data at slot "13" at least because the terminal device 307 is in reception mode at slot "13" (since it determined to not transmit at the next available slot time indicated by the list of transmission opportunities). It should be understood that, similar to the terminal device 306, the satellite communication system may not have received information in advance that indicates whether the terminal device 307 would take advantage of the transmission opportunity at slot "13." Accordingly, at 322, the SMAC scheduler 308 may have also stored downlink data in association with the transmission opportunity of the terminal device 307, in the event that a retransmission is needed. In this case, at 328, the SMAC scheduler 308 may also determine that the receiver of the satellite communication system did not receive uplink data at slot "21" of the SMAC reception slots 304. Accordingly, the SMAC scheduler 308 may infer an implicit acknowledgment that the terminal device 307 received the downlink data transmitted at slot "5" (e.g., at least because the terminal device 307 was in reception mode at slot "13," thus, did not take advantage of the transmission opportunity). In this case, the SMAC scheduler 308 may determine that no retransmission of downlink data is needed to the terminal device 307, and may thus remove downlink data associated with the terminal device 307 from the SMAC storage buffer 312. In this example, the terminal device 307 determined not to transmit any uplink data to the satellite communication system between slot "13" and slot "21," and thus, the SMAC scheduler inferred an implicit acknowledgment. However, in another embodiment, the terminal device 307 may instead determine to transmit uplink data (e.g., using a dedicated channel), for example at slot "12." In this case, using the example above with the same known propagation delay, the uplink data may be received by the receiver of the satellite communication system at slot "20" (e.g., instead of "21"). The SMAC scheduler 308 may then determine, based on the known propagation delay, that the terminal device 307 transmitted the uplink data at slot "12" (and not "13"). Therefore, the SMAC scheduler 308 may determine that the downlink data transmitted at slot "5" does not conflict with the uplink data transmitted at slot "12" of the terminal device 307 slots. Accordingly, the SMAC scheduler 308 may remove the corresponding stored downlink data from the SMAC storage buffer 312. In any case, once the SMAC scheduler 308 infers an implicit acknowledgment that the downlink data was successfully transmitted (e.g., at slot "5") and/or retransmitted (e.g., at slot "22"), the SMAC scheduler 308 may remove the corresponding downlink data for the appropriate terminal device from the SMAC storage buffer 312.

In some embodiments, and, returning to the above example regarding terminal device 306, the terminal device 306 may transmit an explicit acknowledgment to the satellite communication system. For example, suppose that at slot "14," the terminal device 306 transmitted acknowledgment data for reception by the receiver of the satellite communication system at slot "22." In this case, the SMAC scheduler 308 may determine to prioritize the implicit negative acknowledgment (e.g., based on the uplink data received at slot "21") over the conflicting acknowledgment data received at slot "22." Accordingly, the SMAC scheduler 308 may ignore the acknowledgment data, and still retransmit the downlink data at slot "22" from the transmitter. It should be understood that any suitable method prioritization method may be utilized by the satellite communication system.

The example described above depicted two terminal devices 306 and 307. However, it should be understood that embodiments envision any suitable number of a plurality of terminal devices (e.g., five devices, one-hundred devices, one-thousand devices, etc.) being granted transmission opportunities at a particular slot (e.g., slot "13," of FIG. 3). Suppose that, in a case where one-thousand devices are granted a transmission opportunity at slot "13," 80% (e.g., eight-hundred) of the devices determine to not transmit at slot "13" (e.g., represented by terminal device 307), while 20% (e.g., two-hundred) of the devices do transmit (e.g., represented by terminal device 306). In this case, and, using the illustration above, the SMAC scheduler 308 may store downlink data in association with each of the terminal devices being transmitted to at slot "5." However, at 328 (e.g., slot "21"), the SMAC scheduler 308 may infer (e.g., an implicit NACK) that only 20% of the devices utilized the transmission opportunity, and thus necessitate a retransmission. The satellite communication system may correspondingly infer an implicit ACK for the remaining 80% of devices, and remove the associated buffered data for those 80% of the devices. Once the satellite communication system later verifies that the retransmitted data was successfully transmitted to the other 20% of devices (e.g., determining an implicit ACK for the retransmitted downlink data received by each device at slot "30" of 336), the SMAC scheduler 308 may remove the downlink data for those remaining 20% of devices from the SMAC storage buffer 312.

In some embodiments, one or more parameters of the scenario depicted by diagram 300 may be adjusted. For example, in the example described above, the known propagation delay between each device (e.g., terminal device 306, 307) and the satellite communication system was substantially similar (e.g., the same). For example, both devices may have transmitted and/or received data from the same distance to the satellite communication system and/or utilizing the same frequency. Accordingly, the time offset (e.g., the number of offset slots) was the same for both devices. However, in another embodiment, terminal device 307 may be at a different distance (e.g., farther) from the satellite communication system than terminal device 306. In this example, a transmission of downlink data at slot "5" may not arrive at the terminal device until slot "14." Accordingly, assuming that the granted transmission opportunity slots remained the same (e.g., slot "13," "33," etc.), the SMAC scheduler 308 may determine that a storage of the downlink data in the SMAC storage buffer 312 is not needed for terminal device 307 (e.g., because the likelihood of retransmission remains minimal). In another example, the SMAC scheduler 308 may transmit different lists of transmission opportunity slots to different sets of devices, according to any suitable mechanism. For example, the SMAC scheduler 308 may determine to grant terminal device 306 one set of transmission opportunity slots, while granting a different list to terminal device 307. Accordingly, at least because the satellite communication system may include both a transmitter and a receiver (e.g., which may operate simultaneously), the satellite communication system may coordinate transmission and reception of data while the parameters of each data communication may vary between devices (and/or sets of devices).

Figure 4:
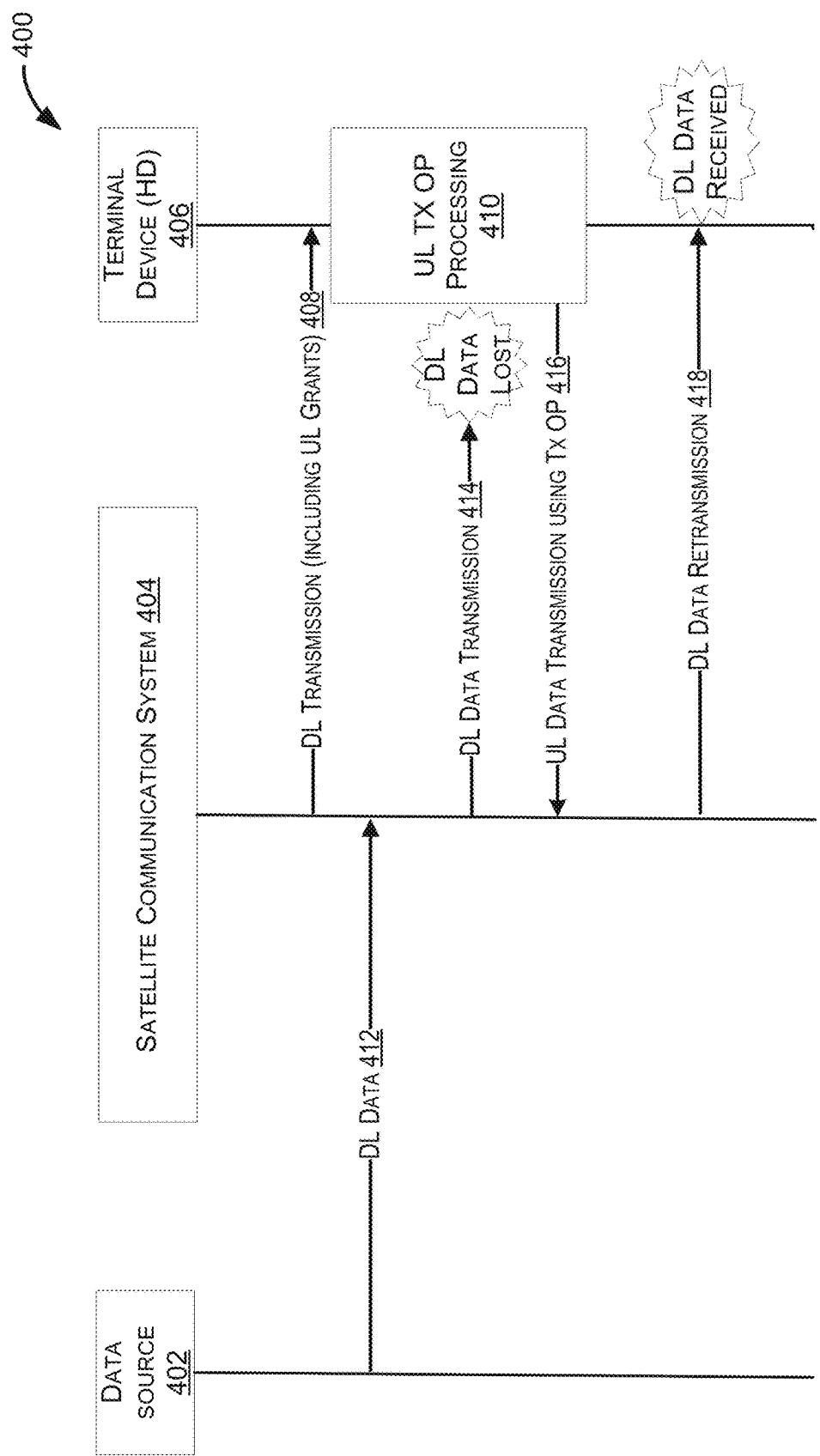
FIG. 4 illustrates an example message exchange process used to synchronize data communications with a device configured to communicate in a half-duplex mode, according to embodiments of the present disclosure.

FIG. 4 illustrates an example message exchange process used to synchronize data communications with a device configured to communicate in a half-duplex mode, according to embodiments of the present disclosure. In diagram 400 of FIG. 4, three elements are depicted, including a data source 402, a satellite communication system 404, and a half-duplex (HD) terminal device 406. The data source 402 may correspond to any suitable data source (e.g., another terminal device, a satellite device, a ground station, etc.), in which the satellite communication system 404 may receive data (e.g., via the Internet, a private network, etc.) to be transmitted (e.g., relayed) to one or more terminal devices (e.g., including terminal device 406). The satellite communication system 404 may be similar to any of the satellite communication systems described herein. It should be understood that the satellite communication system 404 may itself contain one or more software and/or hardware components, each of which may be involved in the message exchange process, as described in further detail herein (e.g., see FIG. 5). The terminal device 406 may be representative of one or more half-duplex terminal devices that, respectively, perform a message exchange process with the satellite communication system 404.

At 408, the satellite communication system 404 may transmit downlink data that corresponds to a grant of one or more transmission opportunities to the terminal device 406. Each transmission opportunity may correspond to a grant to transmit uplink data at a particular slot (e.g., and/or a particular time interval). For example, the satellite communication system 404 may transmit a list of the one or more transmission opportunities (e.g., slot "13," slot "33," etc.), similar to one or more operations of 216 of FIG. 2 (and similar, for FIG. 3).

At 410, the terminal device 406 may determine to transmit uplink data at a particular slot that corresponds to one of the granted transmission opportunities. Upon determining to transmit uplink data (e.g., at slot "13," similar to as described in reference to 218 of FIG. 2), the terminal device 406 may activate a circuitry of the terminal device to switch from a reception mode to a transmission mode of the half-duplex mode. Upon switching to the transmission mode (e.g., for the duration of the time interval corresponding to at least slot "13"), the terminal device 406 may perform one or more operations to prepare (e.g., process) the uplink data for transmission. For example, the terminal device may retrieve data from memory, generate a data packet that includes the data, generate information to be included in a packet header, etc. While the terminal device is processing data in the transmission mode to prepare for transmitting the uplink data, the terminal device 406 may not be able to receive downlink data (e.g., since the circuitry is not set to the reception mode).

At 412, the satellite communication system 404 may receive data from the data source 402 to be transmitted as downlink data to the terminal device 406. For example, the satellite communication system 404 may retrieve data from a data queue, whereby the data was originally transmitted from another device over an Internet connection, received by the satellite communication system 404, and inserted into the data queue for subsequent transmission to the terminal device 406 (e.g., similar to one or more operations of 220 of FIG. 2).

At 414, the satellite communication system 404 may transmit the downlink data to the terminal device 406. As depicted in FIG. 4 and described with respect to 410 above, because the terminal device 406 is not in a reception mode while the uplink data is being processed for transmission, the downlink data may not be received by the terminal device 406. In some embodiments, prior to (or after) transmitting the downlink data to the terminal device 406, the satellite communication system 404 may store the downlink data in a storage buffer of the satellite communication system 404, in case a future retransmission is needed.

At 416, the terminal device 406 may transmit the uplink data to the satellite communication system 404 using the transmission opportunity (e.g., at slot "13" of FIG. 2).

At 418, the satellite communication system 404 may retransmit the downlink data to the terminal device 406. For example, the satellite communication system 404 may determine that the uplink data was received at slot "21" (e.g., similar to 226 of FIG. 2), infer an implicit NACK, retrieve the downlink data from the storage buffer (stored at 414 above), and then retransmit the downlink data. Note that, in this case, the retransmission of downlink data is successfully received by the terminal device 406 at least because the terminal device 406 is in a reception mode of the half-duplex mode.

Figure 5:
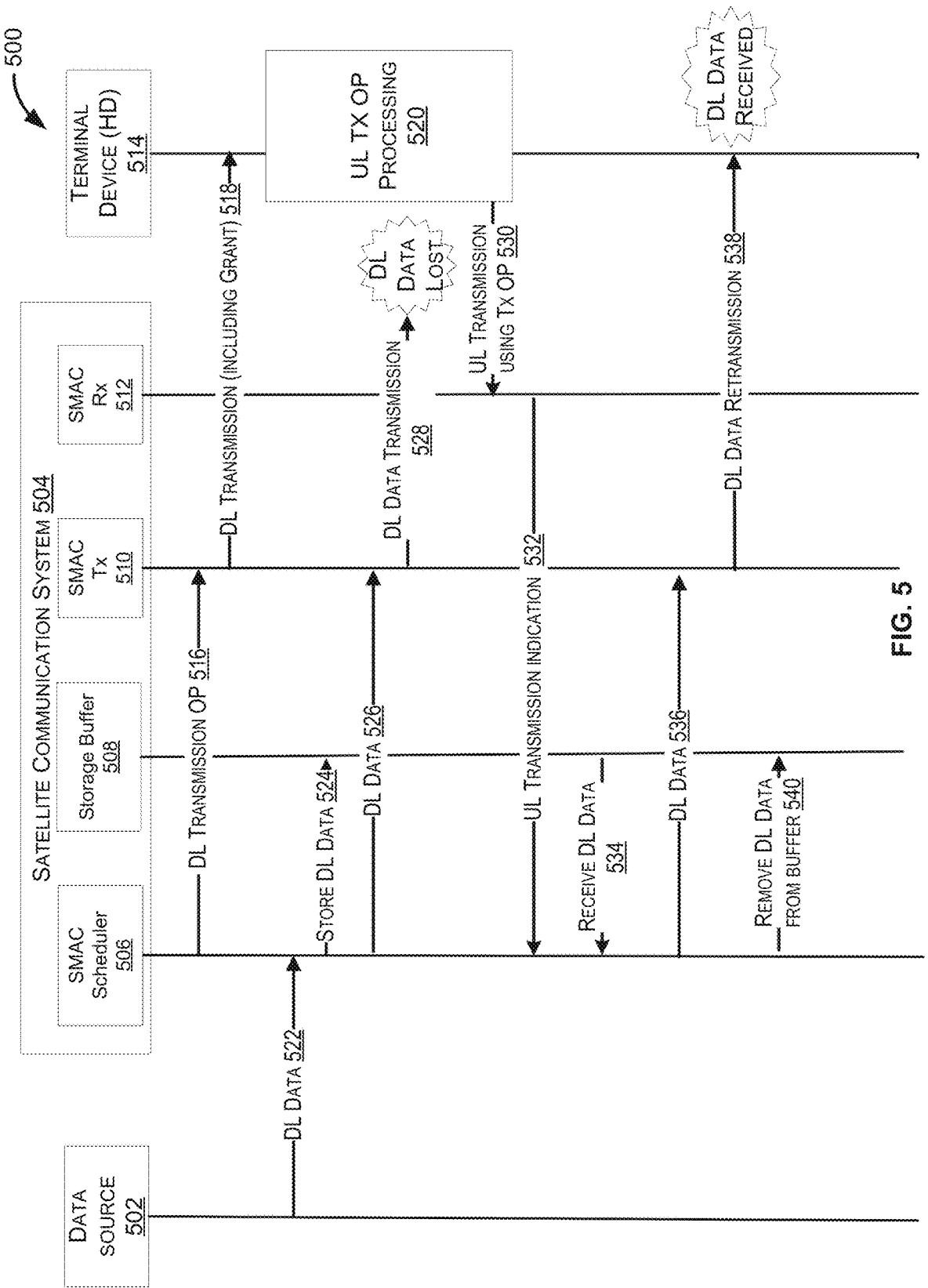
FIG. 5 illustrates another example message exchange process used to synchronize data communications with a device configured to communicate in a half-duplex mode, according to embodiments of the present disclosure.

FIG. 5 illustrates another example message exchange process used to synchronize data communications with a device configured to communicate in a half-duplex mode, according to embodiments of the present disclosure. As described above, diagram 500 depicts a more detailed view the message exchange process illustrated by FIG. 4. In diagram 500, multiple components within a satellite communication system (e.g., the satellite communication system 404 of FIG. 4) are depicted. In particular, satellite communication system 504 includes an SMAC scheduler 506, a storage buffer 508, a transmitter 510 (e.g., an SMAC transmitter ("SMAC Tx")), and a receiver 512 (e.g., an SMAC transmitter ("SMAC Rx")). These components may be implemented via software, hardware, and/or any suitable combination thereof. As described further herein, each of these components may transmit and/or receive messages (e.g., internally within the satellite communication system 504) amongst each other, and the satellite communication system 504, as a collective system, may transmit and/or receive messages with other entities (e.g., as described with respect to FIG. 4). In diagram 500, a data source 502 and a half-duplex customer terminal device 514 may be similar, respectively, to the data source 402 and the terminal device 406 of FIG. 4.

At 516, the SMAC scheduler 506 may determine one or more transmission opportunities for the terminal device 514. The SMAC scheduler 506 may transmit (e.g., over a data bus) a message to the transmitter 510, similar to 214 of FIG. 2.

At 518, the transmitter 510 may transmit downlink data that corresponds to a grant of one or more transmission opportunities to the terminal device 514. For example, a list that corresponds to the grant of transmission opportunities may include slot "13," slot "33," as described in reference to FIG. 2.

At 520, the terminal device 514 may determine to transmit uplink data at a particular slot that corresponds to one of the granted transmission opportunities. For example, the terminal device 514 may determine to utilize slot "13" to transmit uplink data, and may perform one or more operations to prepare the data for transmission (e.g., retrieving the data from memory, generating a data packet, etc.).

At 522, the SMAC scheduler 506 may receive data from the data source 502, indicating that data is ready (e.g., received into a data queue via the Internet) to be transmitted (e.g., relayed) as downlink data to the terminal device 514.

At 524, the SMAC scheduler 506 may determine that a transmission of downlink data at a particular slot is expected to be received by the terminal device 514 at one of the slots corresponding to a transmission opportunity (e.g., slot "13" of FIG. 2). Accordingly, the SMAC scheduler 506 may store the downlink data in the storage buffer 508. As described herein, the downlink data may be stored in the storage buffer using any suitable identifier(s) associated with the transmission of the particular downlink data to the particular terminal device (e.g., terminal device 514) at a particular slot. For example, the SMAC scheduler 506 may store a unique identifier corresponding to terminal device 514, an identifier corresponding to the transmission slot (e.g., slot "5" of FIG. 2), an identifier corresponding to an expected reception slot (e.g., slot "13" of FIG. 2), etc.

At 526, the SMAC scheduler 506 may transmit information to the transmitter 510 instructing the transmitter to transmit the downlink data at the particular slot (e.g., slot "5" of FIG. 2).

At 528, the transmitter 528 may transmit the downlink data to the terminal device 514. Note that the downlink data is not received by the terminal device 514 at least because the terminal device is not a reception mode (e.g., similar to 414 of FIG. 4).

At 530, the terminal device 514 may transmit the uplink data to the receiver 512 of the satellite communication system 504 using the transmission opportunity (e.g., at slot "13").

At 532, the receiver 512 may transmit information to the SMAC scheduler 506 indicating that uplink data was received from the terminal device 514 at a particular slot (e.g., slot "21" of FIG. 2). As described herein, the receiver 512 and/or SMAC scheduler 506 may determine, based on a known propagation delay, that the uplink data was transmitted by the terminal device 514 at a slot corresponding to the transmission opportunity (e.g., slot "13").

At 534, the SMAC scheduler 506 may transmit a request to the storage buffer 508 to receive the downlink data from the storage buffer 508. The SMAC scheduler 506 may transmit this request based in part on determining that the previously transmitted downlink data (e.g., at 528) was not received by the terminal device 514 (e.g., inferring an implicit negative acknowledgment).

At 536, the SMAC scheduler 506 may transmit a request to the transmitter 510 to retransmit the downlink data at a particular slot (e.g., slot "22" of FIG. 2). For example, the SMAC scheduler 506 may determine that a retransmission from slot "22" is expected for reception by the terminal device 514 at a slot that is not a transmission opportunity (e.g., similar to 234 of FIG. 2).

At 538, the transmitter 510 may retransmit the downlink data to the terminal device 514. As described further herein (e.g., with respect to FIGS. 5 and 6), the SMAC scheduler 506 may subsequently infer an implicit ACK from the terminal device 514.

At 540, upon the SMAC scheduler 506 inferring an implicit ACK from the terminal device 514, the SMAC scheduler 506 may remove (e.g., delete) the downlink data from the storage buffer 508. In some embodiments, the SMAC scheduler 506 may remove the downlink data from the storage buffer according to any suitable method. For example, in one case, the SMAC scheduler 506 may determine to retransmit data at a particular time slot whereby a reception of the retransmitted data by the terminal device 514 is expected at a time slot in which the terminal device 514 can only receive data (e.g., in a reception mode) and not be able to send data. In this case, the SMAC scheduler 506 may remove the downlink data from the storage buffer immediately upon (e.g., before or after) retransmitting the downlink data, without waiting to infer an implicit ACK. In another case, the SMAC scheduler 506 may determine to retransmit the downlink data whereby there is a possibility that the terminal device 514 may be sending data (e.g., in a transmission mode) at the same slot in which the retransmitted data is expected to be received. In this case, the SMAC scheduler 506 may wait to remove the downlink data from the storage buffer 508 until the SMAC scheduler 506 infers an implicit ACK, as described further herein. In some cases, for example, if the satellite communication system 504 performs multiple failed retransmissions of the downlink data (e.g., inferring a series of implicit NACKs), the SMAC scheduler 506 may timeout the retransmission (e.g., according to a predefined timeout interval, such as 100 milliseconds, 500 milliseconds, 1 second, 10 seconds, etc.), and then subsequently remove the downlink data from the storage buffer 508. It should be understood that the storage buffer 508 may be implemented using any suitable data structure and/or storage mechanism (e.g., a memory cache, a hard disk drive, etc.). In some embodiments, the storage buffer may have a limiting amount of storage space. Accordingly, as described above, even if no implicit ACK is inferred by the SMAC scheduler 506 after several retransmissions, a particular downlink data may be removed from the buffer after a predefined timeout interval (e.g., a predefined number of slots).

Figure 6:
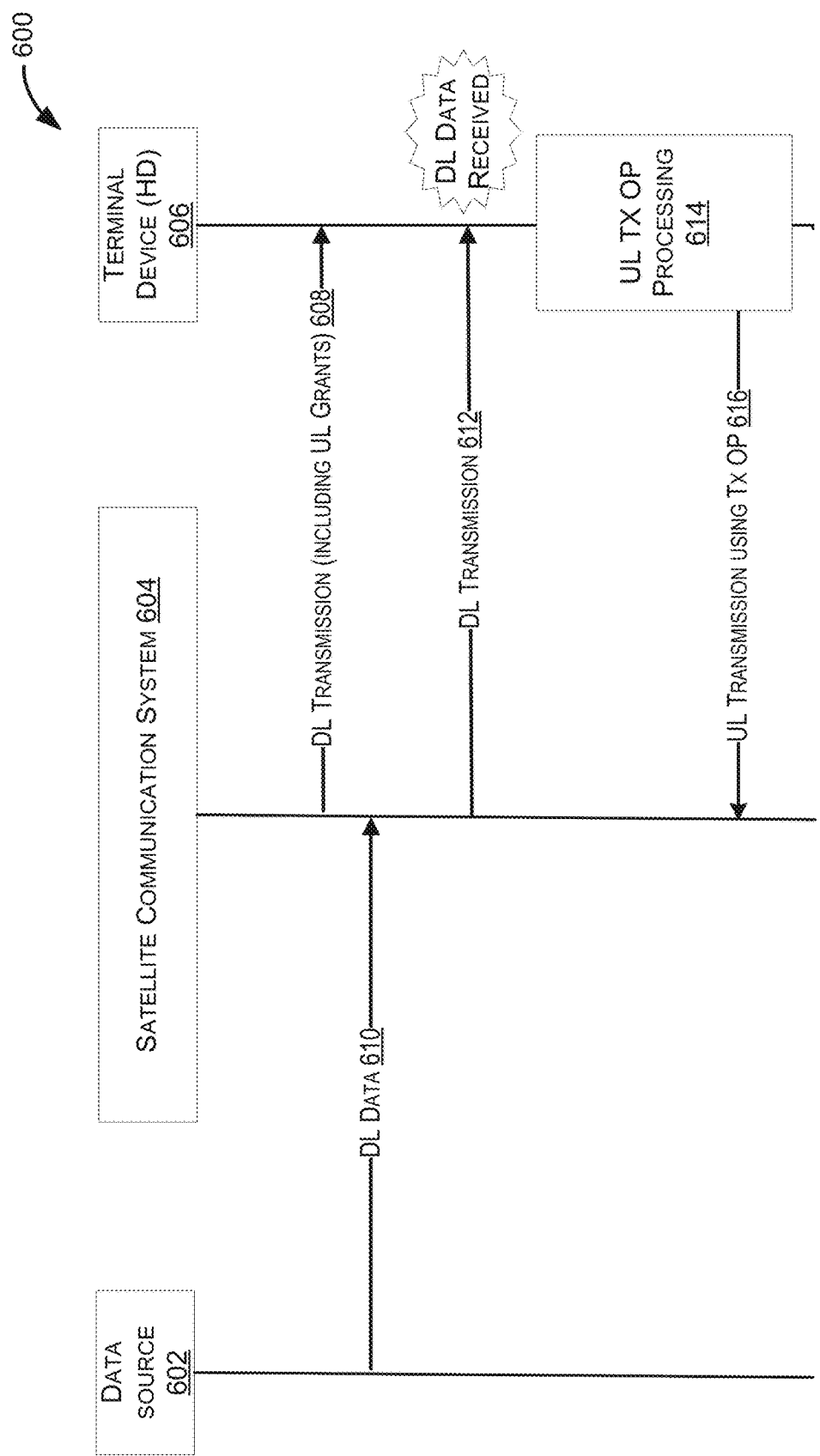
FIG. 6 illustrates another example message exchange process used to synchronize data communications with a device configured to communicate in a half-duplex mode, according to embodiments of the present disclosure.

FIG. 6 illustrates another example message exchange process used to synchronize data communications with a device configured to communicate in a half-duplex mode, according to embodiments of the present disclosure. The components of the diagram 600 of FIG. 6 are similar to FIGS. 4 and 5, including a data source 602, a satellite communication system 604, and a terminal device 606. Diagram 600 illustrates a scenario in which the satellite communication system 604 infers an implicit acknowledgment. In this example, the implicit acknowledgment may be inferred by determining that uplink data, received at a particular slot by the satellite communication system 604, was not transmitted from the terminal device 606 at a slot (e.g., corresponding to a transmission opportunity slot of one or more transmission opportunity slots available to the terminal device 606) in which downlink data sent from the satellite communication system 604 was expected to be received by the terminal device 606.

At 608, the satellite communication system 604 may transmit downlink data that corresponds to a grant of one or more transmission opportunities (e.g., including slot "13" of FIG. 2) to the terminal device 606. In some embodiments, one or more operations of 608 may be similar to one or more operations of 408 of FIG. 4. Note that, in this case, the terminal determines not to take advantage of the transmission opportunity at slot "13," and therefore does not switch to transmission mode. Accordingly, the terminal device 606 may remain in a reception mode of the half-duplex mode at slot "13."

At 610, the satellite communication system 604 may receive data from the data source 602 to be transmitted as downlink data to the terminal device 606 (e.g., data previously received via the Internet for subsequent relay by the satellite communication system 604). Because the satellite communication system 604 may not obtain advanced information about whether the terminal device 606 will take advantage of the transmission opportunity at slot "13," the satellite communication system 604 may store the downlink data in a storage buffer of the satellite communication system 604 in case a future retransmission is needed, as described herein.

At 612, the satellite communication system 604 may transmit downlink data to the terminal device 606. In this case, the downlink data is received by the terminal device 606 (e.g., at slot "13") because the terminal device 606 is still in reception mode.

At 614, the terminal device 606 may determine to transmit uplink data at another available time slot (e.g., slot "14" of FIG. 2, using a dedicated channel). The terminal device 606 may switch to a transmission mode for processing of the uplink data.

At 616, terminal device 606 may transmit the uplink data to the satellite communication system 604 for reception by the satellite communication system 604 at another time-shifted slot (e.g., slot "22" of the receiver slots 204 of FIG. 2). Upon receiving the uplink data at slot "22," the satellite communication system 604 (e.g., the SMAC scheduler) may infer an implicit acknowledgment based on determining that the uplink data was transmitted from another slot (e.g., slot "14") that is not the slot (e.g., slot "13") in which the downlink data was expected for reception by the terminal device 606. In some embodiments, upon the satellite communication system 604 determining that uplink data received from the terminal device 606 was not transmitted using any of the transmission opportunities granted to the terminal device 606 (e.g., within a predefined number (sequence) of slot opportunities), the satellite communication system 604 may infer an implicit ACK from the terminal device 606. Upon inferring an implicit ACK, the satellite communication system 604 may remove the stored downlink data using a method similar to the one described at 540 of FIG. 5.

Figure 7:
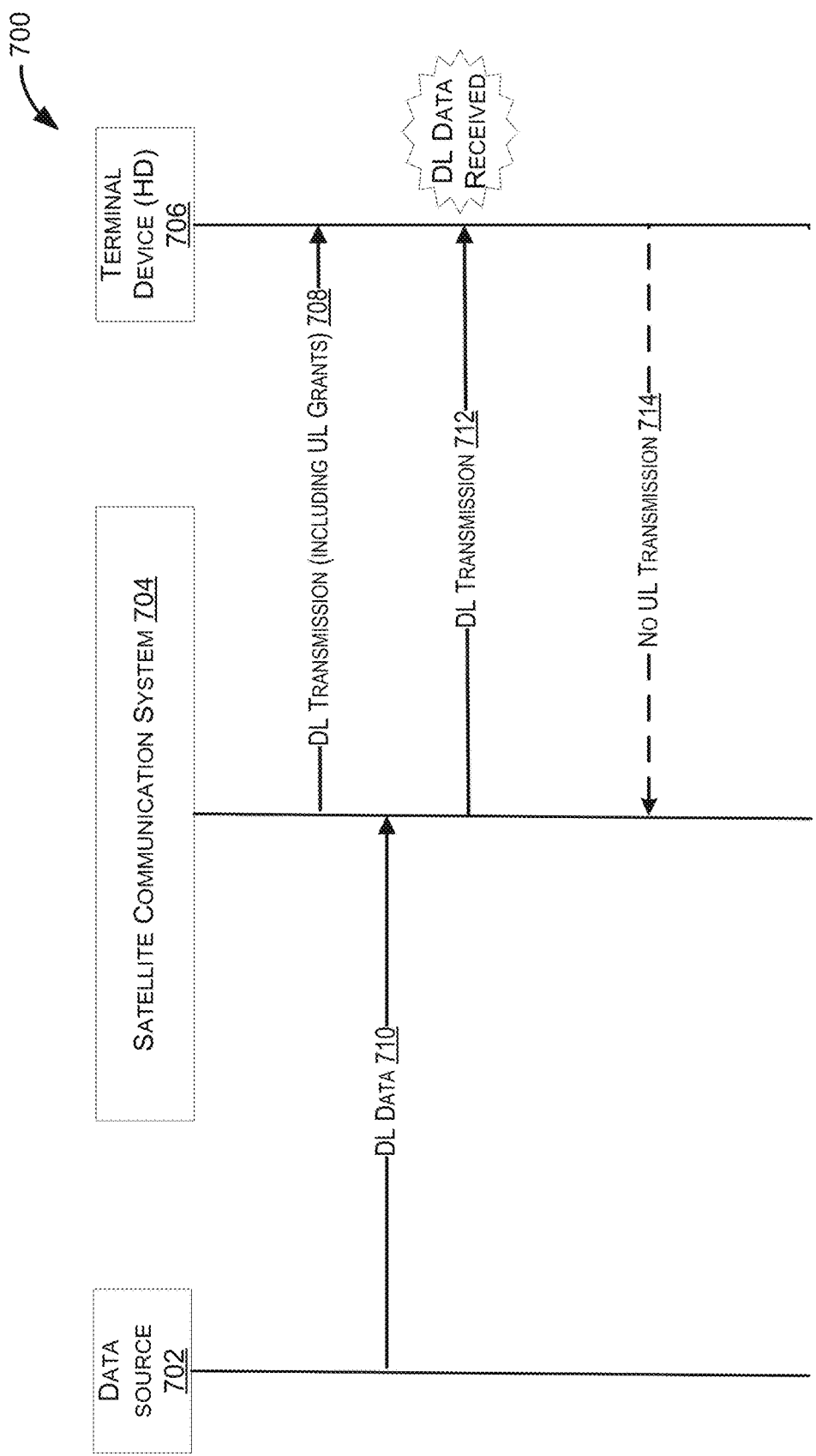
FIG. 7 illustrates another example message exchange process used to synchronize data communications with a device configured to communicate in a half-duplex mode, according to embodiments of the present disclosure.

FIG. 7 illustrates another example message exchange process used to synchronize data communications with a device configured to communicate in a half-duplex mode, according to embodiments of the present disclosure. The components of the diagram 700 of FIG. 7 are similar to FIGS. 4-6, including a data source 702, a satellite communication system 704, and a terminal device 706. Diagram 700 illustrates another scenario in which the satellite communication system 704 infers an implicit acknowledgment. In this example, the implicit acknowledgment may be inferred by determining that no uplink data was received by the satellite communication system 704 from the terminal device 706 (e.g., within a particular time interval).

At 708, the satellite communication system 704 may transmit downlink data that corresponds to a grant of one or more transmission opportunities (e.g., including slot "13" of FIG. 2) to the terminal device 706. Note that, in this case, the terminal device 706 determines not to take advantage of the transmission opportunity at slot "13," and therefore does not switch to transmission mode. Accordingly, the terminal device 706 may remain in a reception mode of the half-duplex mode.

At 710, the satellite communication system 704 may receive data from the data source 702 (e.g., via the Internet) to be transmitted as downlink data to the terminal device 706. Because the satellite communication system 704 may not obtain advanced information about whether the terminal device 706 will take advantage of the transmission opportunity at slot "13," the satellite communication system 704 may store the downlink data in a storage buffer of the satellite communication system 704 in case a future retransmission is needed, as described herein.

At 712, the satellite communication system 704 may transmit downlink data to the terminal device 706. In this case, similar to as described in reference to FIG. 6, the downlink data is received by the terminal device 706 (e.g., at slot "13").

At 714, because the terminal device 706 determines not to transmit any uplink data within a particular time interval (e.g., between slots "10" and "15" of the terminal device slots), the satellite communication system 704 may infer an implicit acknowledgment (e.g., because the terminal device 706 was in reception mode during this time interval). Note that the dotted line in FIG. 7 at 714 indicates that no uplink data was transmitted by the terminal device 706 (e.g., within a particular time interval). Any suitable predefined time interval (and/or number of offset slots) may be utilized by the satellite communication system 704 to confirm that no uplink data was transmitted by the terminal device 706 to the satellite communication system 704. Accordingly, the satellite communication system 704 may remove the stored downlink data from the storage buffer upon inferring the implicit acknowledgment using a method similar to the one described at 540 of FIG. 5.

Figure 9:
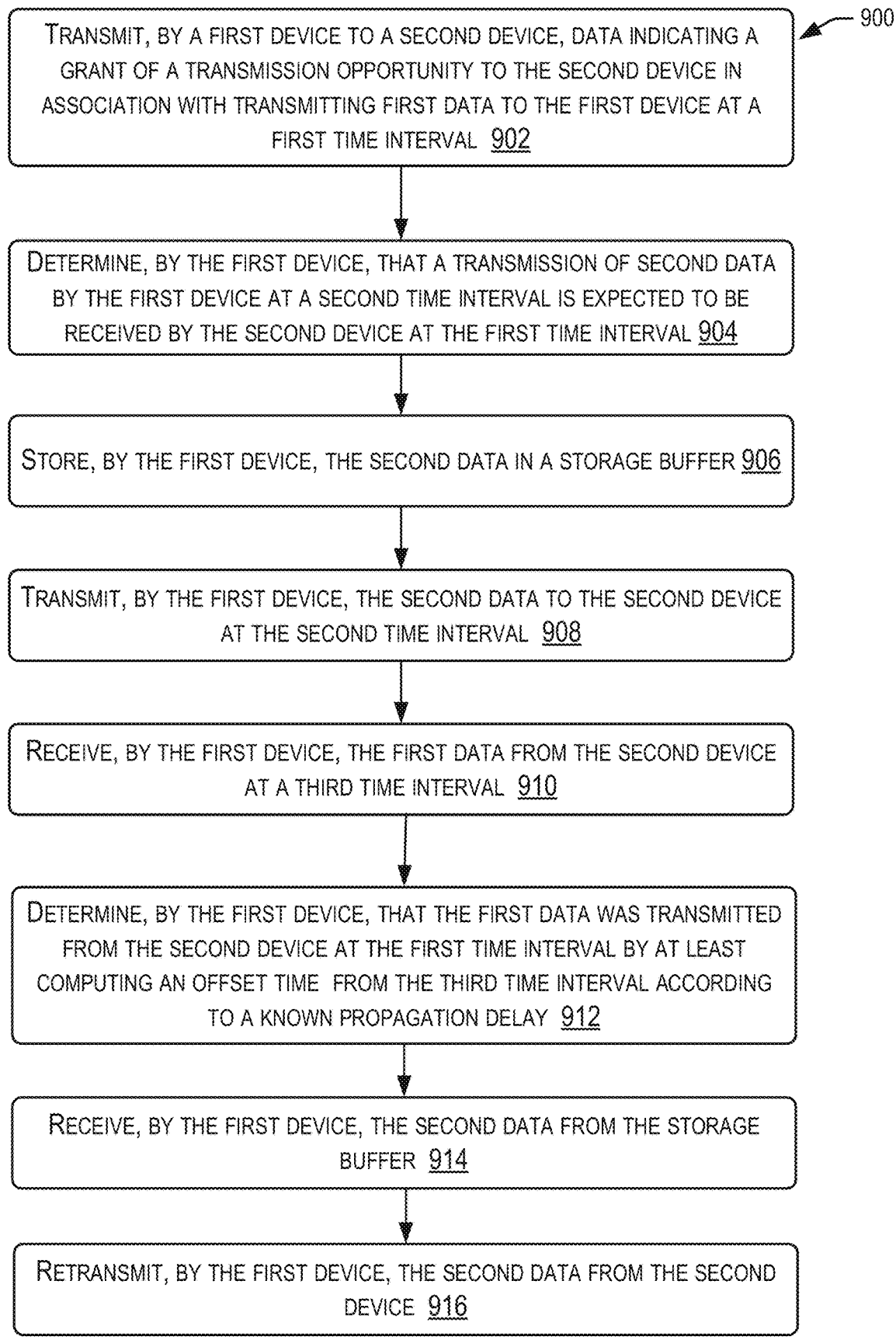
FIG. 9 illustrates another example flow for synchronizing data communications with a device configured to communicate in a half-duplex mode, according to embodiments of the present disclosure.
Figure 10:
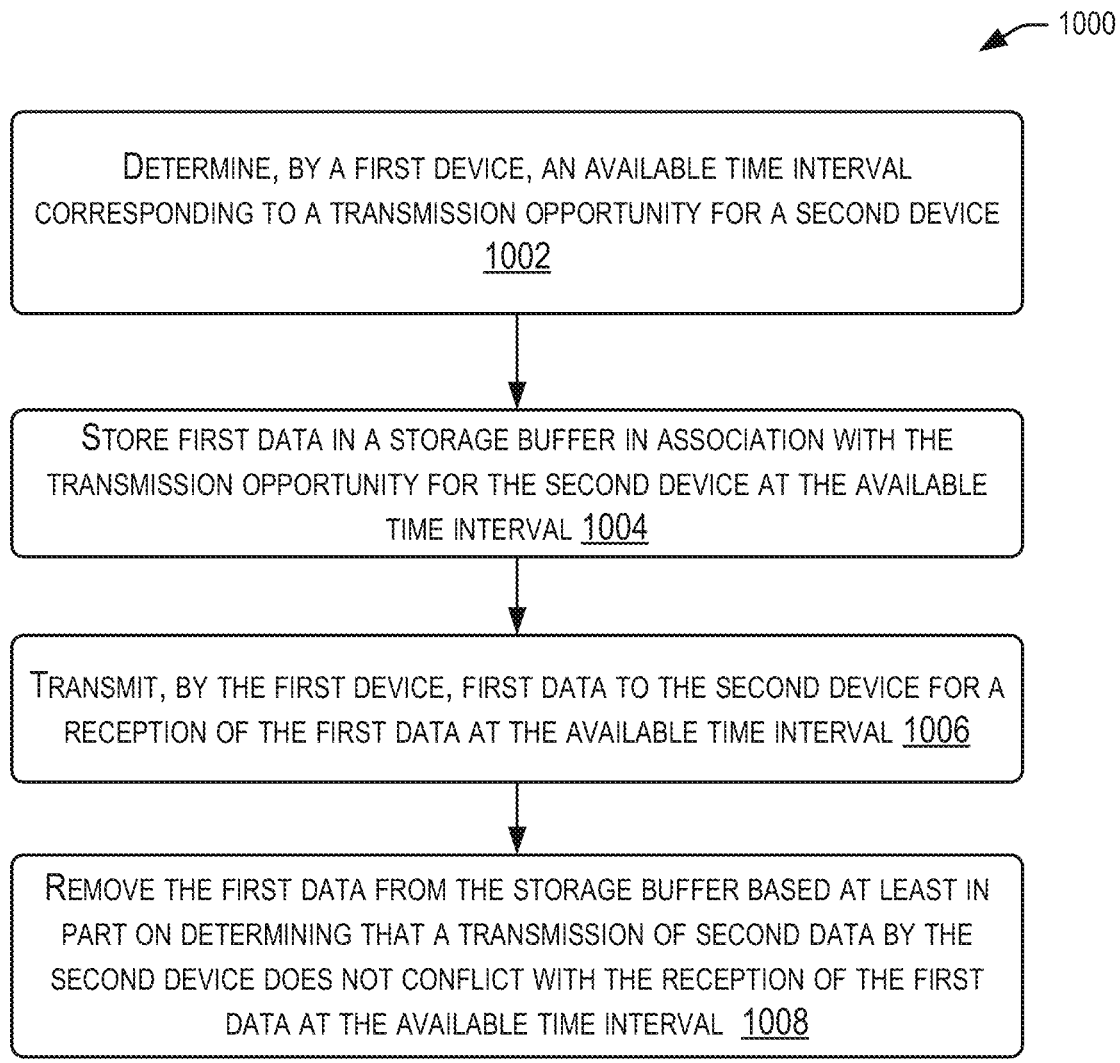
FIG. 10 illustrates another example flow for synchronizing data communications with a device configured to communicate in a half-duplex mode, according to embodiments of the present disclosure.
Figure 11:
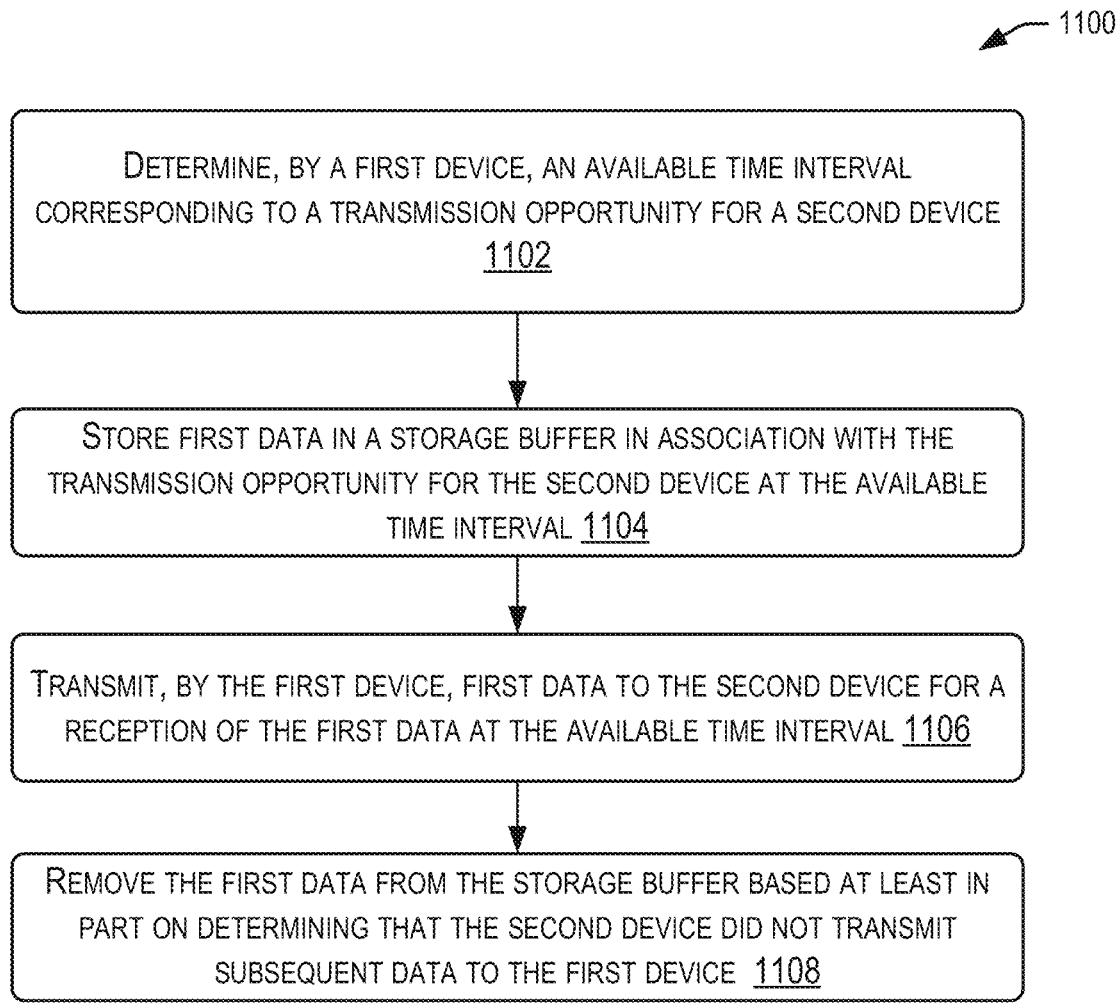
FIG. 11 illustrates an another example flow for synchronizing data communications with a device configured to communicate in a half-duplex mode, according to embodiments of the present disclosure.

FIGS. 8-11 illustrate examples of flows for a first device synchronizing data communications with a second device configured to communicate in a half-duplex mode. The first device may correspond to (and/or be a component of) any satellite described herein in connection with FIGS. 1-7. The second device may correspond to any terminal device described herein in connection with FIGS. 1-7. Processes 800 of FIG. 8, process 900 of FIG. 9, process 1000 of FIG. 10, and process 1100 of FIG. 11 are respectively illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

Figure 8:
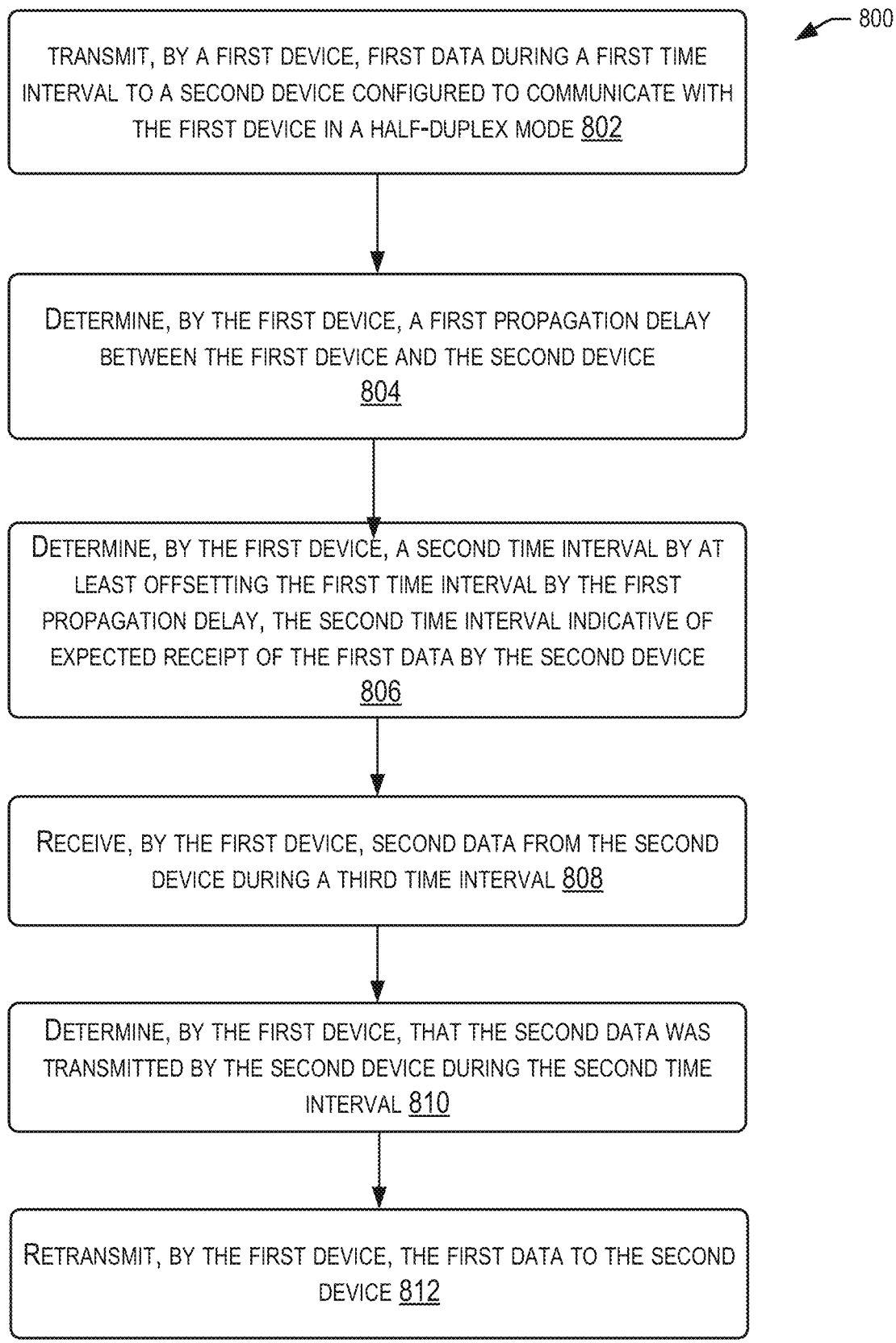
FIG. 8 illustrates an example flow for synchronizing data communications with a device configured to communicate in a half-duplex mode, according to embodiments of the present disclosure.

FIG. 8 illustrates an example flow for synchronizing data communications with a device configured to communicate in a half-duplex mode, according to embodiments of the present disclosure. In FIG. 8, the process 800 illustrates a first device retransmitting first data to a second device upon determining (e.g., inferring, based on an implicit negative acknowledgment) that the first data was not received by the second device.

At block 802, the first device (e.g., a satellite) may transmit, during a first time interval, first data to a second device (e.g., downlink data to a customer terminal device) configured to communicate with the first device in a half-duplex mode. In some embodiments, the first data may correspond to any suitable data (e.g., downlink data), including, but not limited to, user uplink data generated by another terminal device to be relayed to the second device via the first device, data associated with a grant to the second device of access to a dedicated channel, etc. In some embodiments, the first data may be initially received by the first device via a suitable channel and/or network (e.g., the Internet). In some embodiments, the first time interval may correspond to first slot (e.g., slot "5" of FIG. 2). It should be understood that, as described herein with respect to FIGS. 8-11, depending on the context, a "slot" may be described as being an example of a "time interval" and may be used interchangeably with a "time interval."

At block 804, the first device may determine a first propagation delay between the first device and the second device. As described herein, in some embodiments, the first propagation delay may vary based at least in part on a distance between the two devices and/or the frequency of the signal being transmitted. For example, at a given distance and a given transmission frequency, a signal transmitted by the first device to the second device at the given frequency may have a different propagation delay from another signal transmitted from the second device to the first device at a second (e.g., a different) frequency or to another device at a different distance. The propagation delay may be determined based on measurements, such as round trip time measurements, of pervious communications between the first device and the second device, and/or based on clock and transmission scheduling and synchronization (e.g., by using timing advance (TA) commands).

At block 806, the first device may determine a second time interval by at least offsetting the first time interval by the first propagation delay, whereby the second time interval is indicative of expected receipt of the first data by the second device. For example, as described in reference to 220-222 of FIG. 2, the first device may determine that upon sending the first data at slot "5," the first data is expected to be received by the second device at slot "13," based on the first propagation delay. In this example, the first propagation delay may correspond to a number offset slots (e.g., eight offset slots). In some embodiments, if the second time interval corresponds to a time interval in which the second device may send data (e.g., a transmission opportunity), the first data may be stored in a storage buffer upon determining that the first data is expected to be received during the second time interval (e.g., in case a retransmission is necessitated).

At block 808, the first device may receive second data from the second device during a third time interval. In some embodiments, the second data may be any suitable uplink data. For example, as described herein, the uplink data may correspond to control information used to synchronize communications associated with a particular communication channel. In another example, the uplink data may correspond to data originating from the second device that is operated by the user (e.g. Internet data). In some embodiments, the third time interval may correspond to a particular slot that the second device used to transmit the uplink data (e.g., slot "21" of FIG. 2).

At block 810, the first device may determine that the second device transmitted the second data during the second time interval in which the first data was expected to be received by the second device. In some embodiments, the first device may determine that the second data was transmitted from the second device during the second time interval by at least offsetting the second time interval by a known propagation delay (which may be the same or different from the first propagation delay) between the second device and the first device. In this example, the first device may determine that offsetting the second time interval by the known propagation delay may result in the third time interval, during which the second data was received from the second device by the first device. In some embodiments, one or more operations of block 808 may be similar to 228 and/or 230 of FIG. 2, whereby the first device determined that the second data (e.g., the uplink data) was transmitted from slot "13" based in part on receiving the second data at slot "21," with a propagation delay that corresponds to eight offset slots. Upon the first device determining that the second device transmitted the second data during the second time interval, the first device may infer an implicit negative acknowledgment (e.g., an implicit NACK) that indicates to the first device that the first data was not received by the second device. Accordingly, the first device may determine to retransmit the first data to the second device, which may involve retrieving the first data from the storage buffer.

At block 812, the first device may retransmit the first data to the second device during a fourth time interval (e.g., a fourth slot, such as slot "22" of FIG. 2). For example, the first device may determine that retransmitting the first data to the second device during the fourth time. results in the first data being received by the second device during a fifth time interval (e.g., a fifth slot, such as slot "30" of FIG. 2). The first device may also determine that the second device is expected to be in a reception mode of the half-duplex mode at the fifth slot. Accordingly, the first device may retransmit the first data to the second device at the fourth slot, similar to one or more operations of 234-236 of FIG. 2.

FIG. 9 illustrates another example flow for synchronizing data communications with a device configured to communicate in a half-duplex mode, according to embodiments of the present disclosure. In FIG. 9, the process 900 illustrates another scenario which a first device retransmits first data to a second device upon determining (e.g., inferring, based on an implicit negative acknowledgment) that the first data was not received by the second device. The process 900 describes storing data in a storage buffer based on determining that the data is expected for reception at the second device during a same time interval that corresponds to a transmission opportunity for the second device. Then, upon later determining that the second device transmitted data at the transmission opportunity (e.g., thus inferring an implicit negative acknowledgment), the first device retrieves the stored data from the storage buffer for subsequent retransmission to the second device.

At block 902, the first device may transmit to a second device data indicating a grant of a transmission opportunity to the second device in association with transmitting first data to the first device at a first time interval. In some embodiments, the grant may include a plurality of transmission opportunities (e.g., on a periodic basis, or other suitable schedule). In one example, where a time interval can correspond to a slot, a grant of an available slot per thirty slots (e.g., twenty slots per period) may correspond to slots "13" and "33" being available transmission opportunity slots, as depicted with respect to 214 and 216 FIG. 2. In this example, the first time interval may correspond to slot "13" of FIG. 2. A scheduler of the first device may determine the transmission opportunities according to any suitable algorithm or heuristic (e.g., based on a quota, a first-come first-serve basis, etc.). As described herein (e.g., with respect to FIG. 3), it should be understood that a grant of transmission opportunities may be transmitted to more than one device. Accordingly, it should be understood that the process 900 may be performed by the first device with respect to a plurality of devices (e.g., the second device being a representative device).

At block 904, the first device may determine that a transmission of second data by the first device at a second time interval (e.g., a second slot) is expected to be received by the second device at the first time interval (e.g., the first slot). For example, the second slot may correspond to slot "5" of FIG. 2, whereby the downlink data transmitted at slot "5" is expected to be received by the second device at the first slot (e.g., slot "13").

At block 906, the first device may store the second data in a storage buffer. For example, based on the determination performed at block 904, the first device may determine that a retransmission of the second data may be needed (e.g., in case the second device takes advantage of the transmission opportunity at the first slot). Accordingly, the first device may store the second data for subsequent retrieval, in case a retransmission is necessitated.

At block 908, the first device may transmit the second data to the second device at the second time interval (e.g., slot "5" of FIG. 2, as described in reference to 224).

At block 910, the first device may receive the first data from the second device at a third time interval (e.g., a third slot, such as slot "21" of FIG. 2).

At block 912, the first device may determine that the first data was transmitted from the second device at the first time interval by at least computing an offset time from the third time according to a known propagation delay. For example, the offset time may correspond to a number of offset slots, whereby the first device computes the number of offset slots from the third slot (e.g., slot "21" of FIG. 2) and determines that the second device transmitted the first data to the first device at the first slot (e.g., slot "13" of FIG. 2).

At block 914, the first device may receive the second data from the storage buffer. For example, the first device may determine that a retransmission is necessitated based on determining that the second device transmitted the first data to the first device at the first slot. Accordingly, the first device may retrieve the second data from the storage buffer.

At block 916, the first device may retransmit the second data from the second device. For example, the first device may first determine a particular time interval (e.g., a particular slot) to retransmit the second data, as described herein. For example, in some embodiments, prior to retransmitting the second data, the first device may determine to retransmit the second data at a particular slot (e.g., slot "22" of FIG. 2) so that the second data arrives at the second device at a slot (e.g., slot "30" of FIG. 2) that is not another transmission opportunity for the second device (e.g., not slot "33" of FIG. 2). In this example, the first device may remove the second data from the storage buffer even before retransmitting the second data, at least because the second device is likely to receive the retransmission. In some embodiments, upon retransmitting the second data to the second device, the first device may infer an implicit acknowledgment that the second device received the second data, as described herein (e.g., with respect to FIGS. 6 and 7). Upon inferring the implicit acknowledgment, the first device may remove the second data from the storage buffer. It should be understood that the first device may employ any suitable mechanism to determine when to retransmit the second data and/or when to remove the second data from the storage buffer.

FIG. 10 illustrates another example flow for synchronizing data communications with a device configured to communicate in a half-duplex mode, according to embodiments of the present disclosure. In FIG. 10, the process 1000 illustrates a scenario which a first device infers an implicit acknowledgment based at least in part on determining that a reception of first data by the second device at a particular time interval (e.g., corresponding to a transmission opportunity) does not conflict with a transmission of second data by the second device a different time interval from the transmission opportunity.

At block 1002, the first device may determine an available time interval (e.g., an available slot, such as slot "13" of FIG. 2) corresponding to a transmission opportunity for a second device. As described herein (e.g., at 608 of FIG. 6), the first device may transmit data corresponding to the transmission opportunity to the second device.

At block 1004, the first device may store first data in a storage buffer in association with the transmission opportunity for the second device at the available time interval. For example, as described herein, the first device may determine that a transmission of the first data (e.g., received via the Internet) at a particular time interval (e.g., slot "5" of FIG. 2) is expected for reception by the second device at the available time interval. Accordingly, the first device stores the first data in the storage buffer, in case a subsequent retransmission of the first data is necessitated (e.g., in case the second device takes advantage of the transmission opportunity).

At block 1006, the first device may transmit first data to the second device for a reception of the first data at the available time interval (e.g., similar to 612 of FIG. 6). In this case, the first data is successfully received by the second device at least because the second device was in reception mode (e.g., not taking advantage of the transmission opportunity) at the available time interval.

At block 1008, the first device may remove the first data from the storage buffer based at least in part on determining that a transmission of second data by the second device does not conflict with the reception of the first data at the available time interval. For example, as described herein, the second device may transmit the second data at another time interval (e.g., another slot), such as slot "12" of FIG. 2. In this case, the second data may be received by the first device at slot "20" (instead of "21"). Accordingly, the first device may infer that the second data was not transmitted at the available time interval (e.g., slot "13" of FIG. 2), and thus infer an implicit acknowledgment that the first data was received by the second device. Accordingly, the first device may then remove the first data from the storage buffer.

FIG. 11 illustrates another example flow for synchronizing data communications with a device configured to communicate in a half-duplex mode, according to embodiments of the present disclosure. In FIG. 11, the process 1100 illustrates a scenario which a first device infers an implicit acknowledgment based at least in part on determining that the first device did not receive data from the second device.

At block 1102, the first device may determine an available time interval (e.g., an available slot, such as slot "13" of FIG. 2) corresponding to a transmission opportunity for a second device (e.g., similar to block 1002 of FIG. 10).

At block 1104, the first device may store the first data in a storage buffer in association with the transmission opportunity for the second device at the available time interval (e.g., similar to block 1004 of FIG. 10).

At block 1106, the first device may transmit first data to the second device for a reception of the first data at the available time interval (e.g., similar to block 1006 of FIG. 10).

At block 1108, the first device may remove the first data from the storage buffer based at least in part on determining that the second device did not transmit subsequent data (e.g., at the available time interval) to the first device (e.g., inferring an implicit acknowledgment). For example, using FIG. 2 for illustration, the first device may determine that no data was transmitted from the second device from slot "9" through slot "21" of the second device slots. Accordingly, the first device may infer an implicit acknowledgment and remove the first data from the storage buffer (e.g., similar to 714 of FIG. 7).

Figure 12:
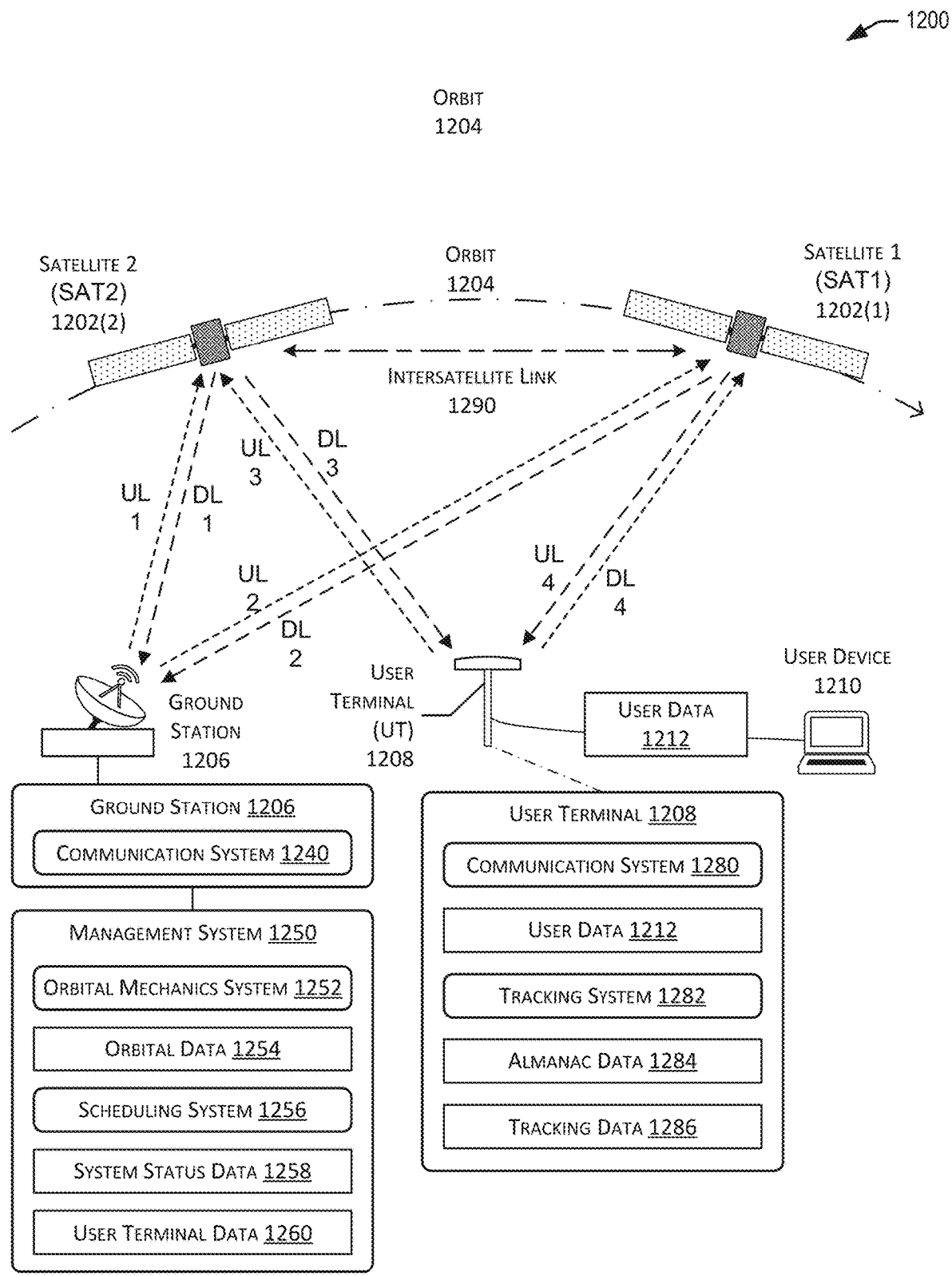
FIG. 12 illustrates an example satellite communication system configured to communicate with one or more devices, according to embodiments of the present disclosure.

The system 1200 shown here with respect to FIG. 12 (e.g., a satellite communication system) comprises a plurality (or "constellation") of satellites 1202(1), 1202(2), . . . , 1202(S), each satellite 1202 being in orbit 1204. Also shown is a ground station 1206, user terminal (UTs) 1208, and a user device 1210.

The constellation may comprise hundreds or thousands of satellites 1202, in various orbits 1204. For example, one or more of these satellites 1202 may be in non-geosynchronous orbits (NGOs) in which they are in constant motion with respect to the Earth. For example, the orbit 1204 is a low earth orbit (LEO). In this illustration, orbit 1204 is depicted with an arc pointed to the right. A first satellite (SAT1) 1202(1) is leading (ahead of) a second satellite (SAT2) 1202(2) in the orbit 1204. The satellite 1202 is discussed in more detail with regard to FIG. 13.

One or more ground stations 1206 are in communication with one or more satellites 1202. The ground stations 1206 may pass data between the satellites 1202, a management system 1250, networks such as the Internet, and so forth. The ground stations 1206 may be emplaced on land, on vehicles, at sea, and so forth. Each ground station 1206 may comprise a communication system 1240. Each ground station 1206 may use the communication system 1240 to establish communication with one or more satellites 1202, other ground stations 1206, and so forth. The ground station 1206 may also be connected to one or more communication networks. For example, the ground station 1206 may connect to a terrestrial fiber optic communication network. The ground station 1206 may act as a network gateway, passing user data 1212 or other data between the one or more communication networks and the satellites 1202. Such data may be processed by the ground station 1206 and communicated via the communication system 1240. The communication system 1240 of a ground station may include components similar to those of the communication system of a satellite 1202 and may perform similar communication functionalities. For example, the communication system 1240 may include one or more modems, digital signal processors, power amplifiers, antennas (including at least one antenna that implements multiple antenna elements, such as a phased array antenna), processors, memories, storage devices, communications peripherals, interface buses, and so forth.

The ground stations 1206 are in communication with a management system 1250. The management system 1250 is also in communication, via the ground stations 1206, with the satellites 1202 and the UTs 1208. The management system 1250 coordinates operation of the satellites 1202, ground stations 1206, UTs 1208, and other resources of the system 1200. The management system 1250 may comprise one or more of an orbital mechanics system 1252 or a scheduling system 1256.

The orbital mechanics system 1252 determines orbital data 1254 that is indicative of a state of a particular satellite 1202 at a specified time. In one implementation, the orbital mechanics system 1252 may use orbital elements that represent characteristics of the orbit 1204 of the satellites 1202 in the constellation to determine the orbital data 1254 that predicts location, velocity, and so forth of particular satellites 1202 at particular times or time intervals. For example, the orbital mechanics system 1252 may use data obtained from actual observations from tracking stations, data from the satellites 1202, scheduled maneuvers, and so forth to determine the orbital elements. The orbital mechanics system 1252 may also consider other data, such as space weather, collision mitigation, orbital elements of known debris, and so forth.

The scheduling system 1256 schedules resources to provide communication to the UTs 1208. For example, the scheduling system 1256 may determine handover data that indicates when communication is to be transferred from the first satellite 1202(1) to the second satellite 1202(2). Continuing the example, the scheduling system 1256 may also specify communication parameters such as frequency, timeslot, and so forth. During operation, the scheduling system 1256 may use information such as the orbital data 1254, system status data 1258, user terminal data 1260, and so forth.

The system status data 1258 may comprise information such as which UTs 1208 are currently transferring data, satellite availability, current satellites 1202 in use by respective UTs 1208, capacity available at particular ground stations 1206, and so forth. For example, the satellite availability may comprise information indicative of satellites 1202 that are available to provide communication service or those satellites 1202 that are unavailable for communication service. Continuing the example, a satellite 1202 may be unavailable due to malfunction, previous tasking, maneuvering, and so forth. The system status data 1258 may be indicative of past status, predictions of future status, and so forth. For example, the system status data 1258 may include information such as projected data traffic for a specified interval of time based on previous transfers of user data 1212. In another example, the system status data 1258 may be indicative of future status, such as a satellite 1202 being unavailable to provide communication service due to scheduled maneuvering, scheduled maintenance, scheduled decommissioning, and so forth.

The user terminal data 1260 may comprise information such a location of a particular UT 1208. The user terminal data 1260 may also include other information such as a priority assigned to user data 1212 associated with that UT 1208, information about the communication capabilities of that particular UT 1208, and so forth. For example, a particular UT 1208 in use by a business may be assigned a higher priority relative to a UT 1208 operated in a residential setting. Over time, different versions of UTs 1208 may be deployed, having different communication capabilities such as being able to operate at particular frequencies, supporting different signal encoding schemes, having different antenna configurations, and so forth.

The UT 1208 includes a communication system 1280 to establish communication with one or more satellites 1202. The communication system 1280 of the UT 1208 may include components similar to those of the communication system of a satellite 1202 and may perform similar communication functionalities. For example, the communication system 1280 may include one or more modems, digital signal processors, power amplifiers, antennas (including at least one antenna that implements multiple antenna elements, such as a phased array antenna), processors, memories, storage devices, communications peripherals, interface buses, and so forth. The UT 1208 passes user data 1212 between the constellation of satellites 1202 and the user device 1210. The user data 1212 includes data originated by the user device 1210 or addressed to the user device 1210. The UT 1208 may be fixed or in motion. For example, the UT 1208 may be used at a residence, or on a vehicle such as a car, boat, aerostat, drone, airplane, and so forth.

The UT 1208 includes a tracking system 1282. The tracking system 1282 uses almanac data 1284 to determine tracking data 1286. The almanac data 1284 provides information indicative of orbital elements of the orbit 1204 of one or more satellites 1202. For example, the almanac data 1284 may comprise orbital elements such as "two-line element" data for the satellites 1202 in the constellation that are broadcast or otherwise sent to the UTs 1208 using the communication system 1280.

The tracking system 1282 may use the current location of the UT 1208 and the almanac data 1284 to determine the tracking data 1286 for the satellite 1202. For example, based on the current location of the UT 1208 and the predicted position and movement of the satellites 1202, the tracking system 1282 is able to calculate the tracking data 1286. The tracking data 1286 may include information indicative of azimuth, elevation, distance to the second satellite, time of flight correction, or other information at a specified time. The determination of the tracking data 1286 may be ongoing. For example, the first UT 1208 may determine tracking data 1286 every 100 ms, every second, every five seconds, or at other intervals.

With regard to FIG. 12, an uplink is a communication link which allows data to be sent to a satellite 1202 from a ground station 1206, UT 1208, or device other than another satellite 1202. Uplinks are designated as UL1, UL2, UL3 and so forth. For example, UL1 is a first uplink from the ground station 1206 to the second satellite 1202(2). In comparison, a downlink is a communication link which allows data to be sent from the satellite 1202 to a ground station 1206, UT 1208, or device other than another satellite 1202. For example, DL1 is a first downlink from the second satellite 1202(2) to the ground station 1206. The satellites 1202 may also be in communication with one another. For example, an intersatellite link 1290 provides for communication between satellites 1202 in the constellation.

The satellite 1202, the ground station 1206, the user terminal 1208, the user device 1210, the management system 1250, or other systems described herein may include one or more computer devices or computer systems comprising one or more hardware processors, computer-readable storage media, and so forth. For example, the hardware processors may include application specific integrated circuits (ASICs), field-programmable gate arrays (FPGAs), digital signal processors (DSPs), and so forth. Embodiments may be provided as a software program or computer program including a non-transitory computer-readable storage medium having stored thereon instructions (in compressed or uncompressed form) that may be used to program a computer (or other electronic device) to perform the processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Figure 13:
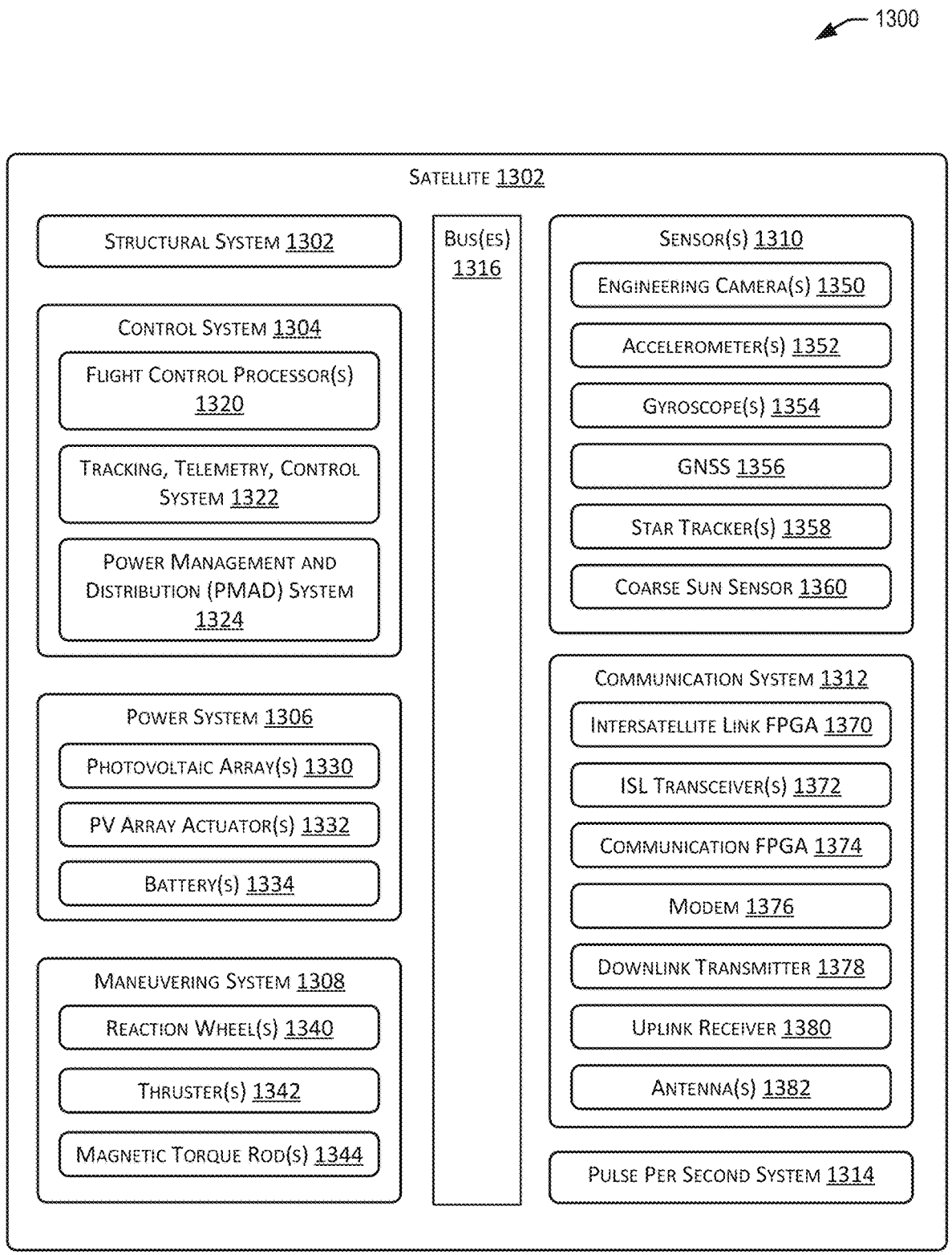
FIG. 13 illustrates an example of components of a satellite communication system, according to embodiments of the present disclosure.

FIG. 13 is a block diagram of some systems associated with the satellite 1202, according to some implementations. The satellite 1202 may comprise a structural system 1302, a control system 1304, a power system 1306, a maneuvering system 1308, one or more sensors 1310, and a communication system 1312. A pulse per second (PPS) system 1314 may be used to provide timing reference to the systems onboard the satellite 1202. One or more busses 1316 may be used to transfer data between the systems onboard the satellite 1202. In some implementations, redundant busses 1316 may be provided. The busses 1316 may include, but are not limited to, data busses such as Controller Area Network Flexible Data Rate (CAN FD), Ethernet, Serial Peripheral Interface (SPI), and so forth. In some implementations the busses 1316 may carry other signals. For example, a radio frequency bus may comprise coaxial cable, waveguides, and so forth to transfer radio signals from one part of the satellite 1202 to another. In other implementations, some systems may be omitted or other systems added. One or more of these systems may be communicatively coupled with one another in various combinations.

The structural system 1302 comprises one or more structural elements to support operation of the satellite 1202. For example, the structural system 1302 may include trusses, struts, panels, and so forth. The components of other systems may be affixed to, or housed by, the structural system 1302. For example, the structural system 1302 may provide mechanical mounting and support for solar panels in the power system 1306. The structural system 1302 may also provide for thermal control to maintain components of the satellite 1202 within operational temperature ranges. For example, the structural system 1302 may include louvers, heat sinks, radiators, and so forth.

The control system 1304 provides various services, such as operating the onboard systems, resource management, providing telemetry, processing commands, and so forth. For example, the control system 1304 may direct operation of the communication system 1312. The control system 1304 may include one or more flight control processors 1320. The flight control processors 1320 may comprise one or more processors, FPGAs, and so forth. A tracking, telemetry, and control (TTC) system 1322 may include one or more processors, radios, and so forth. For example, the TTC system 1322 may comprise a dedicated radio transmitter and receiver to receive commands from a ground station 1206, send telemetry to the ground station 1206, and so forth. A power management and distribution (PMAD) system 1324 may direct operation of the power system 1306, control distribution of power to the systems of the satellite 1202, control battery 1334 charging, and so forth.

The power system 1306 provides electrical power for operation of the components onboard the satellite 1202. The power system 1306 may include components to generate electrical energy. For example, the power system 1306 may comprise one or more photovoltaic arrays 1330 comprising a plurality of photovoltaic cells, thermoelectric devices, fuel cells, and so forth. One or more PV array actuators 1332 may be used to change the orientation of the photovoltaic array(s) 1330 relative to the satellite 1202. For example, the PV array actuator 1332 may comprise a motor. The power system 1306 may include components to store electrical energy. For example, the power system 1306 may comprise one or more batteries 1334, fuel cells, and so forth.

The maneuvering system 1308 maintains the satellite 1202 in one or more of a specified orientation or orbit 1204. For example, the maneuvering system 1308 may stabilize the satellite 1202 with respect to one or more axes. In another example, the maneuvering system 1308 may move the satellite 1202 to a specified orbit 1204. The maneuvering system 1308 may include one or more of reaction wheel(s) 1340, thrusters 1342, magnetic torque rods 1344, solar sails, drag devices, and so forth. The thrusters 1342 may include, but are not limited to, cold gas thrusters, hypergolic thrusters, solid-fuel thrusters, ion thrusters, arcjet thrusters, electrothermal thrusters, and so forth. During operation, the thrusters may expend propellant. For example, an electrothermal thruster may use water as propellant, using electrical power obtained from the power system 1306 to expel the water and produce thrust. During operation, the maneuvering system 1308 may use data obtained from one or more of the sensors 1310.

The satellite 1202 includes one or more sensors 1310. The sensors 1310 may include one or more engineering cameras 1350. For example, an engineering camera 1350 may be mounted on the satellite 1202 to provide images of at least a portion of the photovoltaic array 1330. Accelerometers 1352 provide information about acceleration of the satellite 1202 along one or more axes. Gyroscopes 1354 provide information about rotation of the satellite 1202 with respect to one or more axes. The sensors 1310 may include a global navigation satellite system (GNSS) 1356 receiver, such as Global Positioning System (GPS) receiver, to provide information about the position of the satellite 1202 relative to Earth. In some implementations the GNSS 1356 may also provide information indicative of velocity, orientation, and so forth. One or more star trackers 1358 may be used to determine an orientation of the satellite 1202. A coarse sun sensor 1360 may be used to detect the sun, provide information on the relative position of the sun with respect to the satellite 1202, and so forth. The satellite 1202 may include other sensors 1310 as well. For example, the satellite 1202 may include a horizon detector, radar, lidar, and so forth.

The communication system 1312 provides communication with one or more other devices, such as other satellites 1202, ground stations 1206, user terminals 1208, and so forth. The communication system 1312 may include one or more modems 1376, digital signal processors, power amplifiers, antennas (including at least one antenna that implements multiple antenna elements, such as a phased array antenna) 1382, processors, memories, storage devices, communications peripherals, interface buses, and so forth. Such components support communications with other satellites 1202, ground stations 1206, user terminals 1208, and so forth using radio frequencies within a desired frequency spectrum. The communications may involve multiplexing, encoding, and compressing data to be transmitted, modulating the data to a desired radio frequency, and amplifying it for transmission. The communications may also involve demodulating received signals and performing any necessary de-multiplexing, decoding, decompressing, error correction, and formatting of the signals. Data decoded by the communication system 1312 may be output to other systems, such as to the control system 1304, for further processing. Output from a system, such as the control system 1304, may be provided to the communication system 1312 for transmission.

The communication system 1312 may include hardware to support the intersatellite link 1290. For example, an intersatellite link FPGA 1370 may be used to modulate data that is sent and received by an ISL transceiver 1372 to send data between satellites 1202. The ISL transceiver 1372 may operate using radio frequencies, optical frequencies, and so forth.

A communication FPGA 1374 may be used to facilitate communication between the satellite 1202 and the ground stations 1206, UTs 1208, and so forth. For example, the communication FPGA 1374 may direct operation of a modem 1376 to modulate signals sent using a downlink transmitter 1378 and demodulate signals received using an uplink receiver 1380. The satellite 1202 may include one or more antennas 1382. For example, one or more parabolic antennas may be used to provide communication between the satellite 1202 and one or more ground stations 1206. In another example, a phased array antenna may be used to provide communication between the satellite 1202 and the UTs 1208.

What is claimed is:

1. A method comprising:
   transmitting, by a satellite, downlink data during a first time interval to a customer terminal device configured to communicate with the satellite in a half-duplex mode;
   determining, by the satellite, a propagation delay between the satellite and the customer terminal device;
   determining, by the satellite, a second time interval by at least offsetting the first time interval by the propagation delay, the second time interval indicative of expected receipt of the downlink data by the customer terminal device;
   receiving, by the satellite from the customer terminal device, uplink data during a third time interval that is subsequent to the second time interval;
   determining, by the satellite, that the uplink data was transmitted by the customer terminal device during the second time interval; and
   retransmitting, by the satellite, the downlink data to the customer terminal device.

2. The method of claim 1, further comprising:
   determining, by the satellite, a fourth time interval during which the customer terminal device can send data;
   determining, by the satellite and prior to transmitting the downlink data, that the second time interval is the same as the fourth time interval;
   storing the downlink data in a storage buffer based on the second time interval being the same as the fourth time interval; and
   removing the downlink data from the storage buffer based on the retransmitting of the downlink data.

3. The method of claim 1, further comprising:
   determining, by the satellite, that retransmission of the downlink data during a fifth time interval corresponds to expected receipt of the downlink data by the customer terminal device during a sixth time interval;
   determining, by the satellite, that the customer terminal device can only receive data during the sixth time interval; and
   retransmitting, by the satellite, the downlink data to the customer terminal device during the fifth time interval.

4. A first device, comprising:
   a memory comprising computer-executable instructions; and
   one or more processors in communication with the memory and configured to access the memory and execute the computer-executable instructions to:

transmit, during a first time interval, first data to a second device configured to communicate with the first device in a half-duplex mode;

receive, during a second time interval, second data from the second device;

determine that the second device transmitted the second data during a third time interval that is between the first time interval and the second time interval, wherein the third time interval is during which the second device is expected to receive the first data; and retransmit the first data during a fourth time interval after the second time interval.

5. The first device of claim 4, wherein the memory comprises further computer-executable instructions that, when executed by the one or more processors, further cause the first device to:

determine a fifth time interval during which the second device can send data;

transmit third data to the second device during a sixth time interval, wherein the third data is expected to be received by the second device during the fifth time interval;

store the third data in a storage buffer; and remove the third data from the storage buffer based at least in part on determining that the second device did not transmit subsequent data to the first device.

6. The first device of claim 4, wherein the memory comprises further computer-executable instructions that, when executed by the one or more processors, further cause the first device to:

determine a fifth time interval during which the second device can send data;

transmit third data to the second device, wherein the third data is expected to be received by the second device during the fifth time interval;

store the third data and an identifier of the second device in a storage buffer;

receive fourth data from the second device during a sixth time interval;

determine that the sixth time interval corresponds to a transmission by the second device outside of the fifth time interval; and remove the third data from the storage buffer based at least in part on the transmission by the second device being outside of the fifth time interval.

7. The first device of claim 4, wherein the memory comprises further computer-executable instructions that, when executed by the one or more processors, further cause the first device to:

determine that the second device and a third device can send data to the first device during the third time interval, the third device also configured to communicate with the first device in the half-duplex mode;

store, in a storage buffer, the first data, a first identifier of the second device, and a second identifier of the third device;

transmit the first data to the second device and the third device;

determine that only the second device transmitted data during the third time interval to the first device;

retrieve the first data from the storage buffer based at least in part on the first identifier of the second device; and retransmit the first data to the second device and not the third device.

8. The first device of claim 4, wherein the memory comprises further computer-executable instructions that, when executed by the one or more processors, further cause the first device to:

transmit third data to the second device and a third device, the third device also configured to communicate with the first device in the half-duplex mode;

transmit the first data to the second device and the third device during the first time interval;

determine that reception of the first data is expected by the second device during the third time interval;

determine that reception of the first data is expected by the third device during a fifth time interval during which the third device can only receive data; and store the first data in a storage buffer in association with an identifier of the second device and not of the third device.

9. The first device of claim 4, further comprising:

a transmitter; and a receiver, and wherein the memory comprises further computer-executable instructions that, when executed by the one or more processors, further cause the first device to:

receive, by the transmitter, data indicating a grant to the second device to transmit data to the first device during the third time interval;

transmit, by the transmitter, third data to the second device indicative of the grant;

determine that retransmitting the first data during the fourth time interval will result in the second device receiving the first data during a fifth time interval, wherein the second device is expected to be in a reception mode of the half-duplex mode during the fifth time interval; and retransmit, by the transmitter to the second device, the first data during the fourth time interval.

10. The first device of claim 4, wherein the memory comprises further computer-executable instructions that, when executed by the one or more processors, further cause the first device to:

determine, prior transmitting during the first time interval, that the second device can transmit data during the third time interval;

store the first data and an identifier of the second device in a storage buffer;

determine that the second data was transmitted from the second device during the third time interval based at least in part on a propagation delay between the second device and the first device; and determine to retransmit the first data to the second device during the fourth time interval.

11. The first device of claim 10, wherein determining to retransmit the first data during the fourth time interval further comprises: determining that retransmitting the first data during the fourth time interval will result in the second device receiving the first data during a fifth time interval, wherein the second device is expected to be in a reception mode of the half-duplex mode during the fifth time interval, and wherein the memory comprises further computer-executable instructions that, when executed by the one or more processors, further cause the first device to:

retrieve the first data from the storage buffer based on the identifier of the second device; and retransmit the first data to the second device during the fourth time interval.

12. A method comprising:
transmitting, by a first device and during a first time interval, first data to a second device configured to communicate with the first device in a half-duplex mode;
receiving, by the first device and during a second time interval, second data from the second device;
determining, by the first device, that the second device transmitted the second data during a third time interval that is between the first time interval and the second time interval, wherein the second device is expected to receive the first data during the third time interval; and
retransmitting, by the first device, the first data during a fourth time interval after the second time interval.

13. The method of claim 12, further comprising:
determining, by the first device and prior to transmitting during the first time interval, that the second device can send data during the third time interval; and
storing, by the first device, the first data and an identifier of the second device in a storage buffer.

14. The method of claim 13, further comprising:
determining, by the first device, that retransmitting the first data during the fourth time interval will result in the second device receiving the first data during a fifth time interval, wherein the second device is expected to be in a reception mode of the half-duplex mode during the fifth time interval; and
removing, by the first device, the first data from the storage buffer based at least in part on the identifier of the second device.

15. The method of claim 12, further comprising:
prior to retransmitting the first data to the second device, receiving, by the first device, acknowledgment data indicating that the second device received the first data; and
ignoring, by the first device, the acknowledgment data based at least in part on determining that the second device transmitted the second data during the third time interval.

16. The method of claim 12, further comprising:
determining, by the first device, a fifth time interval during which the second device can send data in a transmission mode of the half-duplex mode;
transmitting, by the first device, third data to the second device, wherein the third data is expected to be received by the second device during the fifth time interval;
storing, by the first device, the third data and an identifier of the second device in a storage buffer; and
removing, by the first device, the third data from the storage buffer based at least in part on determining that the second device did not transmit subsequent data to the first device.

17. The method of claim 12, further comprising:
determining, by the first device, a fifth time interval during which the second device can send data in a transmission mode of the half-duplex mode;
transmitting, by the first device, third data to the second device, wherein the third data is expected to be received by the second device during the fifth time interval;
storing, by the first device, the third data and an identifier of the second device in a storage buffer;
receiving, by the first device, fourth data from the second device during a sixth time interval;
determining, by the first device, that the sixth time interval corresponds to a transmission by the second device outside of the fifth time interval; and
removing, by the first device, the third data from the storage buffer.

18. The method of claim 12, further comprising:
transmitting, by the first device, third data to the second device indicating a grant to the second device to transmit data to the first device during a fifth time interval; and
determining, by the first device, that retransmitting the first data during the fourth time interval will result in the second device receiving the first data outside of the fifth time interval.

19. The method of claim 12, wherein determining that the second device transmitted the second data during a third time interval:
determining, by the first device, a propagation delay between the second device and the first device; and
determining, by the first device, the third time interval by offsetting the second time interval by the propagation delay.

20. The method of claim 12, further comprising:
determining, by the first device, that the second device and a third device can send data during the third time interval, the third device also configured to communicate with the first device in the half-duplex mode;
transmitting, by the first device, the first data to the second device and the third device during the first time interval, wherein the third device a is expected to receive the first data during the third time interval;
determining, by the first device, that only the second device transmitted data during the third time interval to the first device; and
retransmitting, by the first device, the first data to the second device and not the third device.

* * * * *